US011428778B2

(12) United States Patent
Bauduin et al.

(10) Patent No.: US 11,428,778 B2
(45) Date of Patent: Aug. 30, 2022

(54) SYSTEM AND METHOD FOR PERFORMING SPILLOVER CANCELLATION

(71) Applicant: IMEC vzw, Leuven (BE)

(72) Inventors: Marc Bauduin, Brussels (BE); Andre Bourdoux, Theux (BE)

(73) Assignee: IMEC vzw, Leuven (BE)

( * ) Notice: Subject to any disclaimer, the term of this patent is extended or adjusted under 35 U.S.C. 154(b) by 349 days.

(21) Appl. No.: 16/450,885

(22) Filed: Jun. 24, 2019

(65) Prior Publication Data

US 2020/0003866 A1   Jan. 2, 2020

(30) Foreign Application Priority Data

Jun. 29, 2018   (EP) ..................................... 18180668

(51) Int. Cl.
*G01S 7/35* (2006.01)
*H04B 1/525* (2015.01)

(52) U.S. Cl.
CPC .............. *G01S 7/354* (2013.01); *H04B 1/525* (2013.01)

(58) Field of Classification Search
CPC ........ H04B 1/525; H04B 1/10; H04B 1/0475; G01S 7/354; G01S 7/356; G01S 7/2883; G01S 13/584
USPC ................................ 342/189, 196, 104, 165
See application file for complete search history.

(56) References Cited

U.S. PATENT DOCUMENTS

| 8,422,540 | B1 * | 4/2013 | Negus ...................... H04B 1/54 375/219 |
| 8,767,869 | B2 * | 7/2014 | Rimini ..................... H04B 1/30 375/267 |
| 9,065,519 | B2 * | 6/2015 | Cyzs ........................ H04B 1/10 |
| 9,184,902 | B2 * | 11/2015 | Khojastepour ........... H04L 5/14 |
| 9,647,705 | B2 * | 5/2017 | Pack ...................... H04B 1/713 |
| 9,689,967 | B1 * | 6/2017 | Stark ..................... G01S 7/0233 |
| 9,768,793 | B2 * | 9/2017 | Meng .................... H03M 1/124 |

(Continued)

FOREIGN PATENT DOCUMENTS

| EP | 3239732 | 11/2017 |
| WO | WO 2009027900 | 3/2009 |

(Continued)

OTHER PUBLICATIONS

Medra, Alaa. "An 80 GHz Low-Noise Amplifier Resilient to the TX Spillover in Phase-Modulated Continuous-Wave Radars", IEEE Journal of Solid-State Circuits, vol. 51, No. 5, May 2016.

(Continued)

*Primary Examiner* — Erin F Heard
*Assistant Examiner* — Michael W Justice
(74) *Attorney, Agent, or Firm* — Knobbe, Martens, Olson & Bears, LLP

(57) ABSTRACT

In a radar system, a cancellation circuit is described for compensating for the effects of spillover between each transmitter and a receiver. The cancellation circuit is configured for applying cancellation signals to the receiver which are generated in a cancellation filter utilizing a primary impulse response characteristic corresponding to the spillover, a signal to be transmitted from each transmitter in the radar system, and a range profile output from the receiver. The cancellation circuit may also include a secondary impulse response characteristic module and a dithering module to improve the sensitivity of the receiver.

22 Claims, 12 Drawing Sheets

(56) References Cited

U.S. PATENT DOCUMENTS

| | | | |
|---|---|---|---|
| 9,806,929 B2* | 10/2017 | Farabegoli | H03F 3/189 |
| 9,945,943 B2* | 4/2018 | Stark | G01S 7/0233 |
| 10,097,233 B2* | 10/2018 | Pratt | H04L 5/1461 |
| 10,200,075 B2* | 2/2019 | Gianvittorio | H04B 1/525 |
| 10,261,179 B2* | 4/2019 | Davis | G01S 13/87 |
| 10,393,859 B2* | 8/2019 | Marr | G01S 7/292 |
| 10,444,326 B2* | 10/2019 | Hosokawa | H04B 1/525 |
| 10,663,560 B2* | 5/2020 | Ocket | G01S 7/038 |
| 10,784,908 B2* | 9/2020 | Tracht | H04B 1/10 |
| 2009/0213770 A1* | 8/2009 | Mu | H04B 1/123 370/281 |
| 2013/0044791 A1* | 2/2013 | Rimini | H04B 1/525 375/219 |
| 2013/0102254 A1* | 4/2013 | Cyzs | H04B 1/10 455/63.1 |
| 2013/0286903 A1* | 10/2013 | Khojastepour | H04B 1/123 370/280 |
| 2013/0343440 A1* | 12/2013 | Negus | H01Q 21/24 375/219 |
| 2014/0072072 A1 | 3/2014 | Ismail et al. | |
| 2014/0315501 A1 | 10/2014 | Rudell et al. | |
| 2016/0119019 A1* | 4/2016 | Pratt | H04W 4/70 370/278 |
| 2016/0173311 A1* | 6/2016 | Farabegoli | H04L 27/3411 455/127.1 |
| 2016/0266245 A1 | 9/2016 | Bharadia | |
| 2017/0019190 A1* | 1/2017 | Pack | H04L 5/1461 |
| 2017/0168140 A1* | 6/2017 | Hosokawa | H04B 1/525 |
| 2017/0179969 A1* | 6/2017 | Meng | H03M 1/08 |
| 2017/0257136 A1* | 9/2017 | Gianvittorio | H04B 1/44 |
| 2017/0293027 A1* | 10/2017 | Stark | G01S 13/87 |
| 2018/0106884 A1* | 4/2018 | Marr | G01S 7/354 |
| 2018/0252809 A1* | 9/2018 | Davis | G01S 7/0234 |
| 2018/0309474 A1* | 10/2018 | Cheung | G01S 7/352 |
| 2019/0386693 A1* | 12/2019 | Tracht | H04L 25/08 |

FOREIGN PATENT DOCUMENTS

| | | | |
|---|---|---|---|
| WO | WO 2017187339 | 11/2017 | |
| WO | WO-2018162958 A1 * | 9/2018 | H04B 1/0475 |

OTHER PUBLICATIONS

A. Tang et al. "Chirp-Partition based Pre-Distortion for Reduced Carrier Leakage in Circulator-based Wide-band FMCW Radar Systems". pp. 1412-1414.

Guermandi, Davide et al. "A 79GHz Binary Phase-Modulated Continuous-Wave Radar Transceiver with TX-to-RX Spillover Cancellation in 28nm CMOS". 2015 IEEE International Solid-State Circuits Conference, Digest of Technical Papers, Feb. 22, 2015, pp. 1-3.

Bauduin, Marc et al. "Mixed-Signal Transmitter Leakage Cancellation for PMCW MIMO Radar", 2018 15th European Radar Conference, European Microwave Association, Sep. 26, 2018, pp. 293-296.

European Search Report dated Jan. 2, 2019, received in EP 18180668.8 filed Jun. 29, 2018.

Bourdoux et al., "PMCW Waveform and MIMO Technique for a 79 GHz CMOS Automotive Radar"; 2016 IEEE Radar Conference (2016).

* cited by examiner

SYSTEM AND METHOD FOR PERFORMING SPILLOVER CANCELLATION

CROSS-REFERENCE TO RELATED APPLICATIONS

This application claims foreign priority to EP 18180668.8, filed Jun. 29, 2018 and titled "IMPROVEMENTS IN OR RELATING TO SPILLOVER CANCELLATION", the content of which is incorporated by reference herein in its entirety.

BACKGROUND

Field

The disclosed technology relates to improvements in or relating to spillover cancellation, and, is more particularly, although not exclusively, concerned with spillover cancellation for phase-modulated continuous wave radar systems for use in automotive applications.

Description of the Related Technology

The main characteristic of continuous wave radar systems is that the transmitter and receiver operate at the same time. In phase-modulated continuous wave (PMCW) and orthogonal frequency division multiplexing (OFDM) continuous wave radar systems, the transmitter transmits the same sequence continuously, and, the signal reflected from a target is received at the receiver. As reception of the reflected signal is performed in parallel with the transmission, a part of the transmitted signal can leak from the transmitter to the receiver. This leakage is also known as spillover.

The leakage or spillover tends to be much stronger than the signals reflected by targets. Therefore, in order to avoid a saturation of the receiver, receiver gain needs to be reduced. However, reducing the receiver gain means that the signals reflected by targets will be more sensitive to the analog-to-digital converter (ADC) quantization. In addition, due to receiver non-linearity, the spillover will increase range side lobes or produce ghost targets which can obscure small targets or create false alarms. For these reasons, a spillover attenuation is required in order to achieve high sensitivity with PMCW radar systems.

Fully analog solutions are known which achieve spillover attenuation using a cancellation signal injected into the receiver before a low noise amplifier or into baseband after mixing, but neither of these solutions are compatible with multiple-input, multiple-output (MIMO) radar systems.

Radar technology is seen as one of the major components in autonomous driving systems due to their ability to evaluate distance, speed and angular position. For the evaluation of angular position, a high resolution can be achieved only with large MIMO radar systems. For this purpose, PMCW radar systems are good candidates as the orthogonality between the transmitters can be achieved in code domain, and, each transmitter can send the same signal multiplied by a code specific to the particular transmitter in order to create the orthogonality, e.g. by using a Hadamard matrix. Code-domain MIMO radar systems can increase the transmitted energy when compared with time-domain MIMO radar systems having the same number of transmitters.

One such code-domain MIMO radar system is described in an article entitled "PMCW waveform and MIMO technique for a 79 GHz CMOS automotive radar", by A. Bourdoux et al., IEEE Radar Conference, 2016. However, only a binary PMCW radar system is described which provides a low complexity transmitter as the carrier is immediately modulated by the binary±1 code sequence. Perfectly orthogonal waveforms need to be applied to different transmitting antennas are required if the associated transmitters are transmitting simultaneously for fast illumination. The use of the Hadamard matrix in PMCW MIMO radar systems provides this orthogonality which is essential. The receiver can then recover the signals sent by each transmitter.

In PMCW radar systems, the waveform may consist of binary values and therefore binary code families developed in other contexts, for example, communications, can be implemented. If different sequences of the same family are used for different transmitting antennas in different transmitters, the cross-correlation for all delays of interest matter because the signals are received with all possible delays corresponding to the range covered by the radar system. However, there may be spillover from the transmitter to the receiver which causes saturation in the receiver degrading the sensitivity of the radar system and creating false detections.

It is therefore advantageous that spillover is at least reduced so that sensitivity of the radar system can be improved and false detections are reduced.

SUMMARY OF CERTAIN INVENTIVE ASPECTS

It is an object of the disclosed technology to provide spillover cancellation for PMCW MIMO radar systems.

It is another object of the disclosed technology to provide spillover cancellation for OFDM continuous wave (CW) MIMO radar systems.

In accordance with one aspect of the disclosed technology, there is provided a method of attenuating the effect of spillover in a radar system having at least one transmitter and at least one receiver, the method comprising the steps of: a) determining, for each transmitter-receiver pair, a primary impulse response characteristic corresponding to a spillover channel between the transmitter and the receiver of the transmitter-receiver pair; b) deriving, for each receiver, a cancellation filter for the receiver of the transmitter-receiver pair based on the primary impulse response characteristic; and c) for each receiver, applying cancellation signals from the cancellation filter to the receiver of transmitter-receiver pair to attenuate the effect of spillover from each transmitter in output data from the receiver; characterized in that the method further comprises the steps of: for each receiver, deriving a cancellation path which includes the cancellation filter; and receiving a signal to be transmitted by each transmitter of the radar system and the output data from the receiver of the transmitter-receiver pair in the cancellation path; and in that step b) comprises, in the cancellation path for each receiver, using the primary impulse response characteristic for each transmitter in the radar system with that particular receiver, the signal to be transmitted by each transmitter, and the output data from the receiver for generating the cancellation signals.

In this way, the primary impulse response characteristic corresponds to the spillover propagation path between the transmitter and the receiver in each transmitter-receiver pair and its use in the cancellation path, in particular, in the cancellation filter cancels or attenuates spillover to address this issue in PMCW and OFDM radar systems.

In MIMO radar systems, it is advantageous that primary impulse response characteristics be determined for each transmitter-receiver pair so that appropriate cancellation can be provided.

In addition, the effects of a strong reflection from a permanent stationary target positioned just in front of the radar system can be cancelled by using the output data from the receiver, that is, a range profile at 0 Doppler. This is particularly relevant when the radar system is behind a stationary target such as an automotive bumper.

The method may further comprise, in the cancellation path of each receiver, adaptively processing the output data from the receiver to update coefficients of the cancellation filter.

The method may further comprise, in the cancellation path of each receiver, inputting the signal to be transmitted by each transmitter to the cancellation filter.

By using the transmitted signal(s), for example, a code sequence, it is possible to ensure that the cancellation filter produces cancellation signals which are relevant to each transmitter when paired with a particular receiver to form a transmitter-receiver pair.

In addition, the method may further comprise the steps of: determining, for each receiver, a secondary impulse response characteristic corresponding to components in the receiver and the cancellation path associated with that receiver; and modifying each cancellation filter in accordance with the secondary impulse response characteristic.

In this way, the effects of components in a secondary path, for example, low pass filters, ADCs, DACs and baseband non-linearity, can also be compensated for to increase the sensitivity of the radar system.

The method may further comprise, in the cancellation path of each receiver, using the secondary impulse response characteristic with the output data from the receiver for updating coefficients of the cancellation filter.

The method may further comprise the step of, for each cancellation path, applying a dithering signal to the output of the cancellation filter to produce a modified cancellation signal.

Such a modified cancellation signal improves the adaptive gain in baseband with the result that the number of bits in the DACs at the output of the cancellation path can be reduced. This is a particular advantage when sampling at rates of 109 samples per second. Moreover, if the receiver includes adaptive amplifiers after the cancellation point, the gain of such amplifiers can be increased while the spillover is attenuated, and, as a consequence, less bits are required in the ADCs.

In one embodiment, for each receiver, the cancellation path may be implemented in time domain. In this case, the radar system operates with code sequences inserted into the transmitted signals.

In another embodiment, for receiver, the cancellation path may be implemented partially in time domain and partially in frequency domain. In this case, the radar system, for example, OFDM radar system, operates with a spectrum signal in the frequency domain which is converted in time domain prior transmission. The transmitter-receiver pair thus operates in the time domain. The cancelation is performed in time domain while the cancellation signal is built in frequency domain.

In accordance with another aspect of the disclosed technology, there is provided a cancellation circuit for cancelling the effect of spillover in a radar system having at least one transmitter and at least one receiver, the circuit comprising: for each transmitter-receiver pair, a primary impulse response module configured for generating a primary impulse response characteristic indicative of a spillover channel between the transmitter and the receiver of the transmitter-receiver pair; for each receiver, a cancellation filter associated therewith and configured for generating cancellation signals for the receiver; and for each receiver, combining elements for applying cancellation signals from the cancellation filter to the receiver to attenuate the effect of spillover in output data from the receiver; characterized in that, for each receiver, the cancellation circuit is configured for defining a cancellation path which includes the cancellation filter for the receiver, the cancellation path being further configured for receiving the primary impulse response characteristic from the primary impulse response module, a signal to be transmitted by each transmitter of the radar system, and the output data from the receiver, and, for providing each signal and the output data from the receiver together with the primary impulse response characteristic as inputs to the cancellation filter for the generation of the cancellation signals therefrom.

As described above, the spillover between the transmitter and receiver in each transmitter-receiver pair can be cancelled by measuring the primary impulse response between the transmitter and the receiver, and, using the primary impulse response characteristic in the cancellation path, in particular, in the cancellation filter to cancel or attenuate spillover to address this issue in PMCW and OFDM radar systems.

In an embodiment, for each receiver, the cancellation path further comprises an adaptive processing module configured for receiving the output data from the receiver to update coefficients for the cancellation filter.

In one embodiment, the adaptive processing module may be implemented as a least mean squares algorithm. Other adaptive algorithms may also be implemented.

In an embodiment, for each receiver, the cancellation path further comprises a secondary impulse response module configured for generating a secondary impulse response characteristic corresponding to components in the receiver and the cancellation path associated with that receiver, and, the cancellation path is further configured for updating coefficients of the cancellation filter in accordance with the secondary impulse response characteristic.

As described above, the secondary impulse response characteristic enables cancellation of effects due to components of the receiver and the cancellation path.

In an embodiment, for each cancellation path of each receiver, the adaptive processing module is further configured for receiving the secondary impulse response characteristic and for using the secondary impulse response characteristic with the output data from the receiver to update coefficients for the cancellation filter.

In an embodiment, for each receiver, the cancellation path further comprises a dithering module configured for generating a dithering signal, and combining means for combining the dithering signal with the cancellation signal to produce a modified cancellation signal.

In accordance with a further aspect of the disclosed technology, there is provided a radar system configured to be connected to a cancellation circuit as described above.

Connection to a radar system provides a means of providing the cancellation to existing radar chips.

In accordance with yet a further aspect of the disclosed technology, there is provided a radar system comprising a cancellation circuit as described above.

BRIEF DESCRIPTION OF THE DRAWINGS

For a better understanding of the disclosed technology, reference will now be made, by way of example, to the accompanying drawings in which:—

FIG. 8a illustrates the range profile for the MIMO radar system for the static target without spillover cancellation of FIG. 7a;

DETAILED DESCRIPTION OF CERTAIN ILLUSTRATIVE EMBODIMENTS

Figure 1:
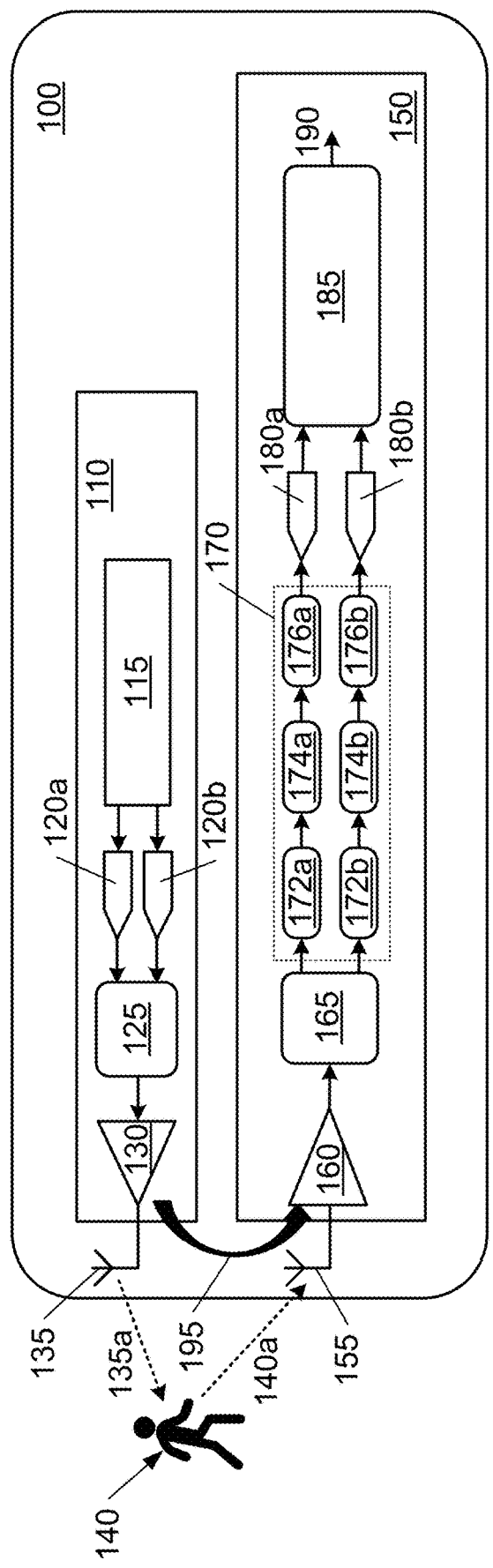
FIG. 1 is a block diagram of a SISO PMCW radar system illustrating the spillover propagation path.

The disclosed technology will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

The disclosed technology is directed to PMCW and OFDM CW radar systems in which the transmitter(s) and the receiver(s) operate in parallel, and, in particular, to both single-input, single-output (SISO) and multiple input, multiple output (MIMO) radar systems.

The disclosed technology is applicable to time domain division (TDD) and frequency domain division (FDD) MIMO systems as well as a code domain MIMO systems. In code domain MIMO systems, Hadamard matrix can be used to separate the transmitted signals at the receiver by multiplying the transmitted signal of each transmitter with a different line of the Hadamard matrix.

In one embodiment of the disclosed technology, each transmitter may transmit the same sequence but a multiplication with the +/−1 sequence of the Hadarmard matrix produces orthogonality.

Such radar systems may be used in the automotive industry, and, in order to meet the required high range resolution for autonomous driving applications, a large bandwidth is required. In one embodiment, a frequency band of 2 GHz around a central frequency of 79 GHz is used. In accordance with the disclosed technology, a 79 GHz single-chip 4×4 MIMO PMCW radar system has been implemented in 28 nm CMOS technology which is compatible with spillover cancellation in accordance with the disclosed technology.

The terms "attenuate", "attenuation", "cancel" and "cancellation" as used herein refer to the compensation for spillover between a transmitter and receiver, particularly, the transmitting antenna and the receiving antenna of a transmitter-receiver pair.

The term "transmitter-receiver pair" as used herein refers to a configuration of any transmitter with any receiver in a radar system. In MIMO radar systems, each transmitter is paired with each receiver. In such cases, there will be multiple transmitter-receiver pairs, for example, for a MIMO radar system having four transmitters and 4 receivers, there would be 16 transmitter-receiver pairs. However, it can be envisaged that a single transmitter may be associated with more than one receiver (SIMO) and vice versa (i.e. multiple input, single output (MISO)).

The terms "primary impulse response" and "primary impulse response characteristic" as used herein are intended to refer to the response characteristic between any transmitter in a radar system and a particular receiver in the radar system. If the radar system is a SISO system, there will only be one primary impulse response as there is only one transmitter and one receiver. If the radar system is a MIMO system having four transmitters and four receivers, for example, for each receiver, there will be four primary impulse responses, that is, one impulse response for each transmitter when paired with that particular receiver.

The terms "secondary impulse response" and "secondary impulse response characteristic" as used herein are intended to refer to the response characteristic within each receiver and its associated cancellation path. As a result, in contrast with the primary impulse response, there is only one secondary impulse response for each receiver.

Whilst FIG. 1 of the disclosed technology is described with respect to a SISO radar system, it will readily be understood that each transmitter-receiver pair in a MIMO radar system can be considered to be a SISO radar system.

FIG. 1 illustrates spillover in a SISO radar system 100. The radar system 100 comprises a transmitter 110 in which a code sequence 115 is generated and converted to analog signals in digital-to-analog converters (DACs) 120a, 120b. The analog signals from the DACs 120a, 120b are passed through a transmit filter 125 to a power amplifier 130 and onto a transmit antenna 135. The analog signals are upconverted to radio frequencies by a mixer (not shown in the figure) prior being transmitted. A transmit signal 135a is directed towards a target 140 with a reflected signal 140a from the target 140 being received at a receiver 150. The receiver 150 comprises a receive antenna 155 which receives the reflected signal 140a from the target 140 and passes it to a low noise amplifier 160 before the amplified signal is mixed in mixer 165 to provide baseband signals. The baseband signals are passed to a baseband processing module 170 where they are processed to provide I and Q signals for respective ones of the ADCs 180a, 180b. As shown, the baseband processing module 170 comprises low pass filters 172a, 172b, variable gain amplifiers (VGAs) 174a, 174b and non-linearity components 174a, 174b (which are effectively virtual components associated with the baseband processing module and not real components). Components in the baseband processing module 170 with the suffix "a" refer to the I signals, for example, in an I branch, and those with the suffix "b" refer to the Q signals, for example, in a Q branch. The digitized signals from the ADCs 180a, 180b are processed in the range and Doppler processing module 185 to provide an output range profile or output data 190 which indicates the presence of targets in front of the radar system 100.

As shown, spillover 195 from the transmitter 110 is received at the receiver 150 together with the reflected signal 140a and therefore has an impact on the processing of the received reflected signal 140a.

In order to address the incompatibility of analog solutions with MIMO radar systems for spillover cancellation, a mixed-signal solution is disclosed herein in which a cancellation signal is estimated in the digital domain and injected into the receiver baseband after the mixer through a DAC. However, an estimate of the contribution from each transmitter needs to be estimated before the cancellation signal for each receiver can be derived.

It is to be noted that, as the cancellation filter is computed iteratively, the filter coefficients can be updated while the radar system is operating. It is interesting, for example, if the radar system is placed behind a bumper. Due to the vibrations of the bumper, the cancellation path needs to be update continuously in order to be able to continuously cancel the strong signal reflected by the bumper.

Figure 2:
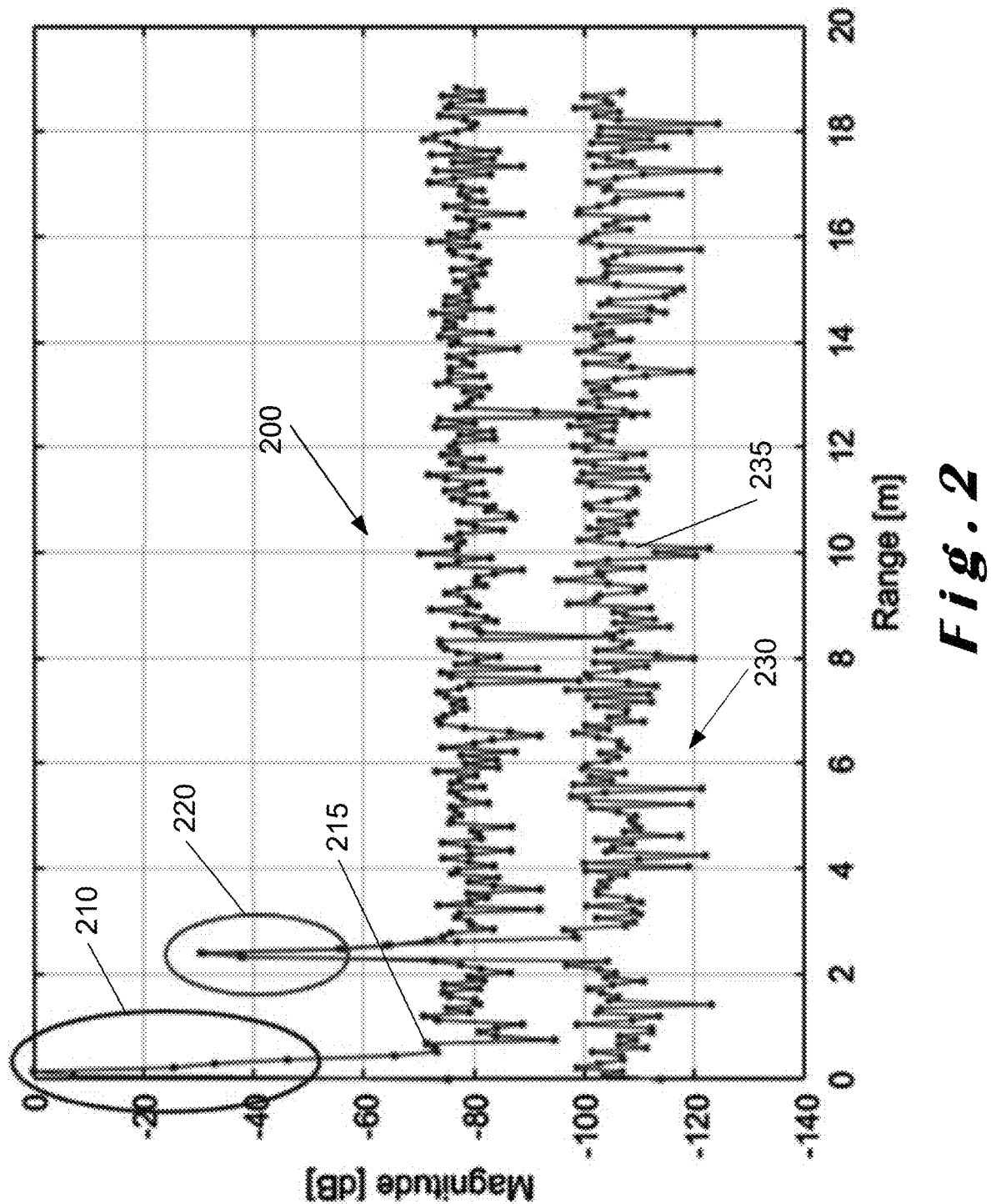
FIG. 2 illustrates the effect of range profiles with and without spillover.

A PMCW radar system estimates the distance of a target using a correlator in order to estimate the delay between a transmitted signal and a received signal to provide a direct measure of the distance of the target. This operation is termed range processing where the output of the correlator is a range profile. In such a range profile, spillover is observed at 0m, that is, at no delay. This is shown in FIG. 2. The range profile is characterized by range bins, each range bin representing a distance from the receiver, and, in turn, a delay.

In the case of an OFDM radar system, the transmitter uses an inverse discrete Fourier transform (IDFT) to transmit a frequency domain sequence. The receiver computes the spectrum of the received signal by applying a discrete Fourier transform (DFT). Then the computed spectrum is divided with the frequency domain transmitter sequence or multiplied with the complex conjugate of the frequency domain transmitter sequence if the spectrum has a constant amplitude, and then recovers the range profile with an IDFT. This provides an impulse response which characterizes the propagation delay of all the received signals. Examples of OFDM radar systems are described below with reference to FIGS. 9 and 10.

Spillover tends to be the dominating signal received at the receiver. In this way, the receiver can be saturated, and, to avoid saturation, receiver gain needs to be reduced. This means that signals reflected by targets are not amplified and only a reduce number of bits in the ADC can quantize a useful range profile signal, that is, the part of the signal which contains the information relating to the target. Moreover, the spillover signal also produces higher range side lobes when compared to a range profile without spillover due to the non-linear behaviour of the receiver.

FIG. 2 illustrates a comparison between range profiles for a target at 2.25 m both with and without spillover. Fluctuations in each range profile are due to noise in the system.

As can readily be seen, with spillover, in the range profile shown by upper trace 200, a peak 210 due to the spillover is obtained at 0 m. In addition to the spillover peak, the spillover will also produce spillover side-lobes distributed over the range profile which may mask the target 220 at 2.25 m. The range profile shows the spillover side-lobes at around −80 dB with a side lobe 215 adjacent the peak 210. Such side lobes are due to the non-ideal performance of the receiver, for example, non-linearities and ADC quantization, combined with the spillover signal. These side lobes therefore reduce sensitivity and are not useful.

Without spillover, in the range profile shown by lower trace 230, the target 220 at 2.25 m can readily be detected with a noise floor 235 being at around −100 dB. This is the ideal situation, and, by cancellation of spillover, the required sensitivity can be obtained.

It is to be noted that FIG. 2 is by way of example for a single specific target at 2.25 m but the target may be at any distance in accordance with the use of the radar system.

Figure 3A:
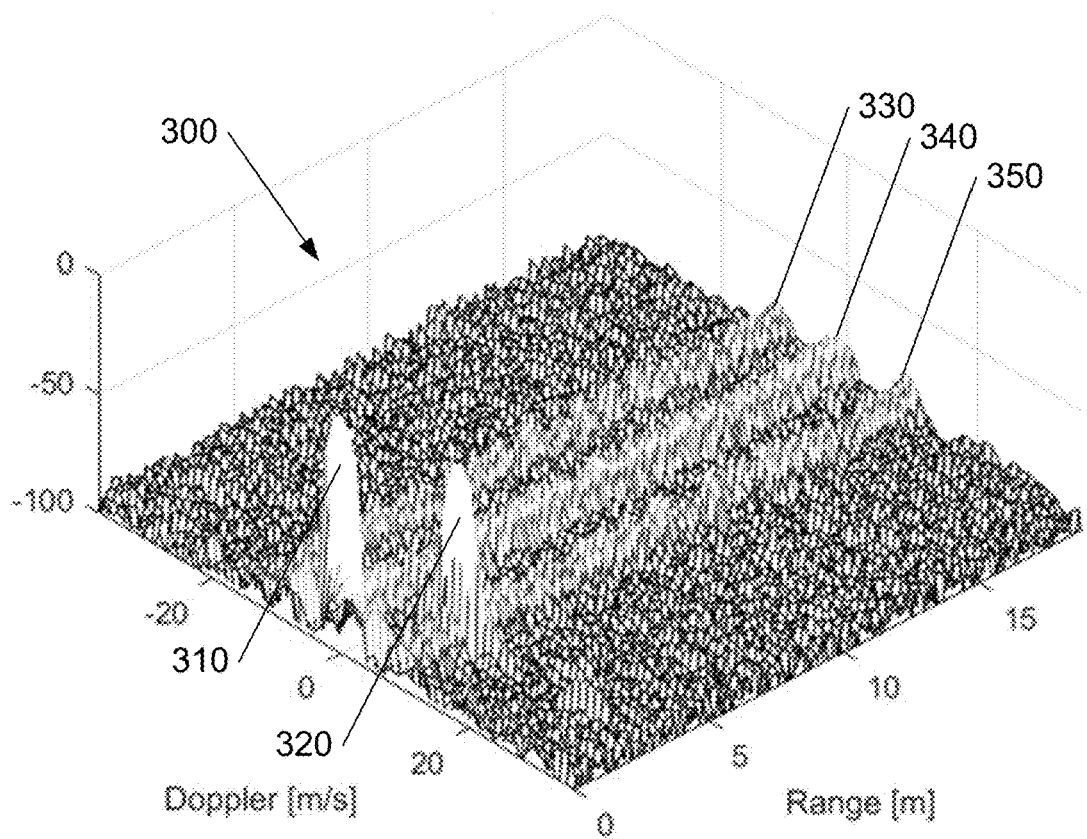
FIGS. 3a and 3b illustrate a perspective view and an top view respectively of a PMCW range-Doppler map for a target moving at 10 ms$^{-1}$.
Figure 3B:
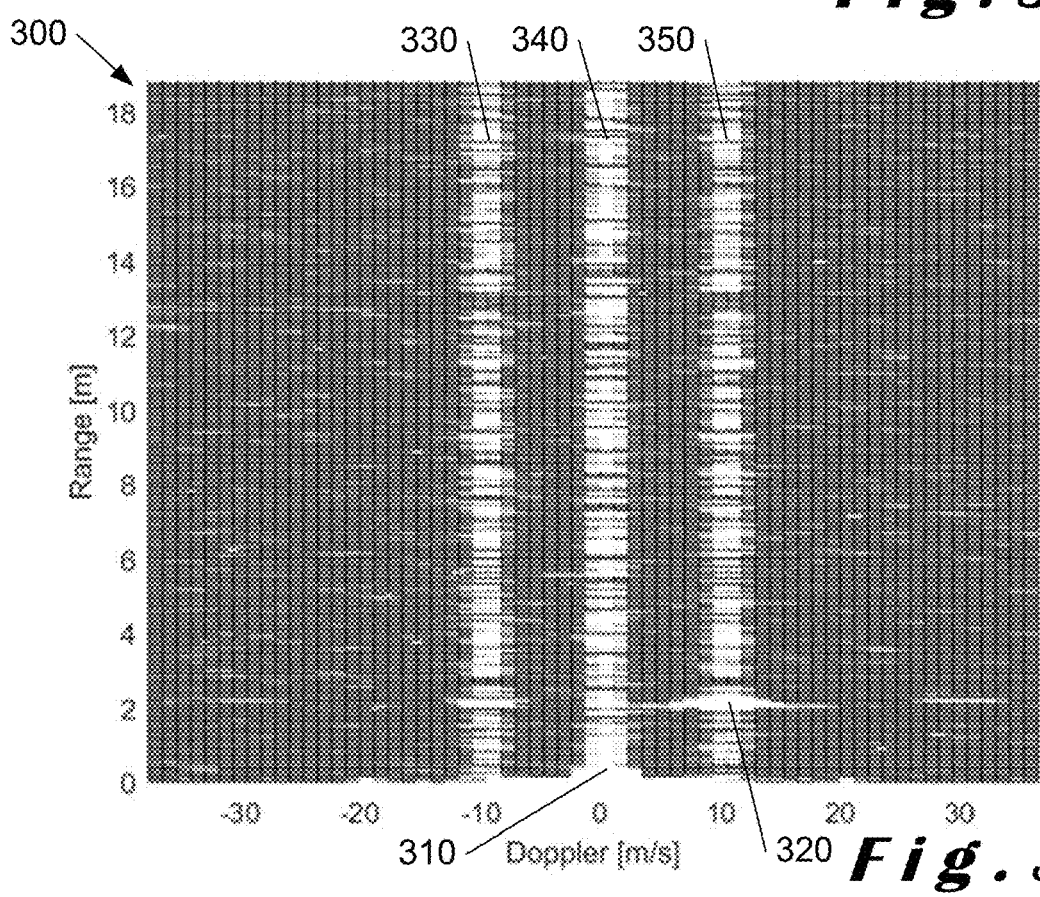

Additional degradations can be observed with moving targets. In order to evaluate their speed, N consecutive range profiles are required in order to perform Doppler processing with the help of a discrete Fourier transform (DFT). Such processing produces a range profile with a number of range bins corresponding to a distance from the receiver, and where each range bin has a plurality of Doppler bins. The output of this operation is called the range-Doppler map as shown in FIGS. 3a and 3b. Ideally, only two peaks should be observed, namely, the spillover and the target. However, because of the combination of the spillover and the non-linearity in baseband together with the reduced number of bits to characterize the moving target, more peaks appear resulting in false detections.

In practice, the range profile is taken at 0 Doppler for a specific transmitter-receiver pair, and, there is one range profile per Doppler bin per transmitter-receiver pair.

As shown in FIGS. 3a and 3b, a range-Doppler map 300 includes peaks 310, 320 and ridges 330, 340, 350 as shown. It will be appreciated that, with spillover, peak 310 corresponds to the spillover as it is at approximately 0m, and peak 320 corresponds to the target at 2.25 m. Ridges 330, 340, 350 are formed as part of the range-Doppler map 300 can hide small targets.

These degradations are produced in the baseband module 175 and by the ADCs 180a, 180b (as shown in FIG. 1), and, the effect of non-linearity of the low noise amplifier 165 may be considered to be negligible in this case. However, this effect may need to be considered in other implementations of radar systems.

Figure 4:
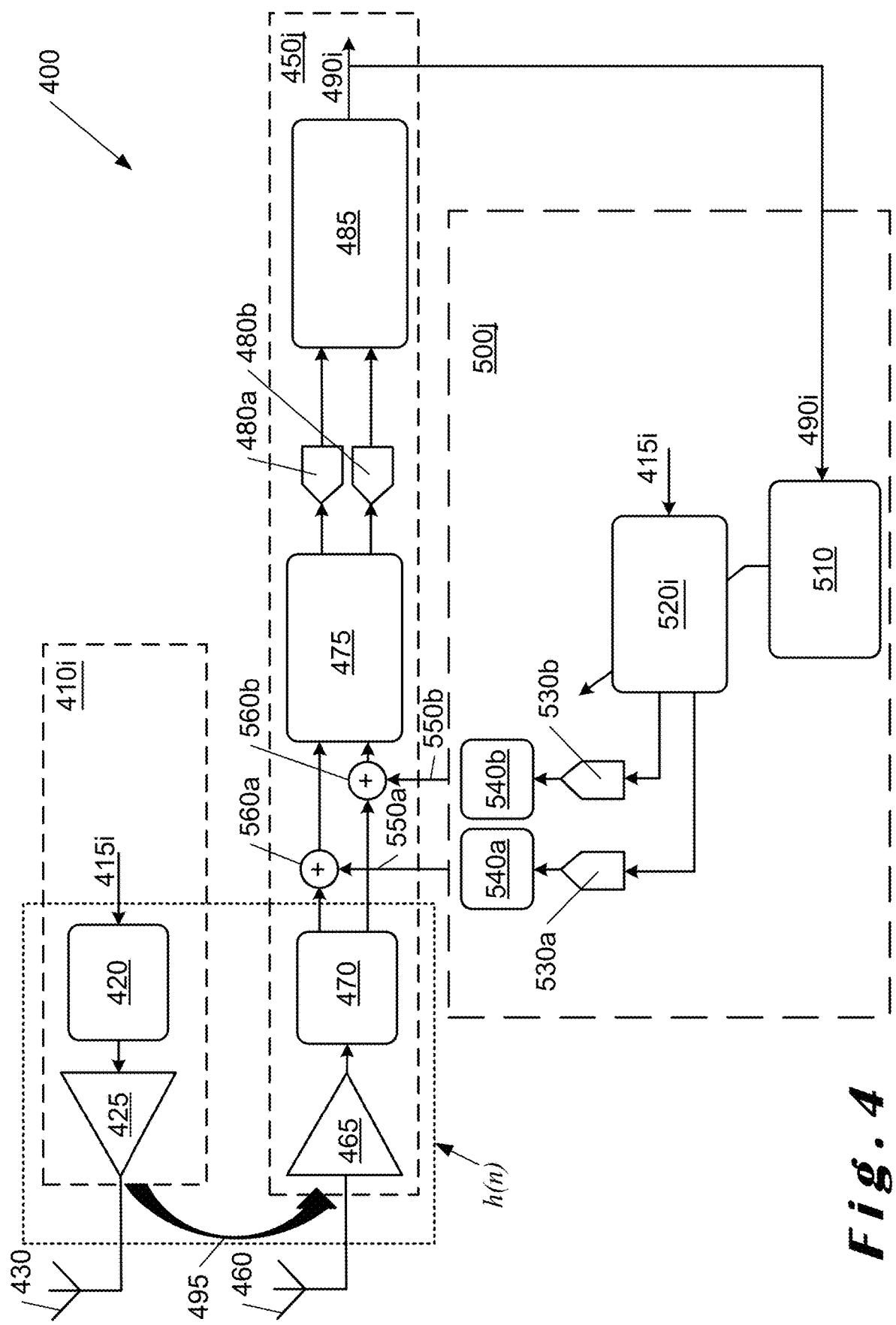
FIG. 4 illustrates a block diagram of a SISO or MIMO PMCW radar system with a cancellation path for spillover.

Sensitivity of the radar system can be improved by cancelling the spillover in the receiver. FIG. 4 illustrates a radar system 400 in which cancellation is applied to the receiver signals just after the mixer.

The radar system 400 is similar to radar system 100 as shown in FIG. 1 but with a cancellation path added. The radar system 400 has been extended to include MIMO radar systems where each receiver has an associated cancellation path providing cancellation signals corresponding to each transmitter-receiver pair associated with that particular receiver.

The radar system 400 comprises a transmitter 410i in which a code sequence 415i is passed through a transmit filter 420 to a power amplifier 425 and onto a transmit antenna 430. Here, the DACs used to convert the code sequence 415i to an analog IQ signal are not shown for ease of explanation.

The suffix "i" represents the index of the transmitter in the radar system, and, in one embodiment, 1=1, 2, 3 or 4 for a four transmitter radar system.

A transmit signal (not shown) is directed towards a target (also not shown) with a reflected signal (not shown) from the target being received at a receiver 450j. Each receiver 450j comprises a receive antenna 460 which receives the reflected signal (not shown) from the target (also not shown) and passes it to a low noise amplifier 465 before the amplified signal is mixed in mixer 470 to provide baseband signals.

The suffix "j" represents the index of the receiver in the radar system, and, in one embodiment, j=1, 2, 3 or 4 for a four receiver radar system.

The baseband signals are passed to a baseband module 475 where they are processed to provide I and Q signals for respective ones of the ADCs 480a, 480b. The digitized signals from the ADCs 480a, 480b are processed in the range and Doppler processing module 485 to provide an output range profile or output data 490 which indicates the presence of targets together with spillover in front of the radar system 400. In MIMO radar systems, the module 485 also performs the MIMO processing.

In the MIMO radar systems, the output range profile or output data from each receiver comprises a range profile or output data 490i for each transmitter.

In accordance with the disclosed technology, a cancellation path 500 is provided which utilizes the output range profile or output data 490 from the range and Doppler processing module 485 to generate cancellation signals which are added to the baseband signals between the mixer 470 and the baseband module 475. This provides an output range profile or output data with spillover cancellation or at least attenuation thereof.

For each receiver 450j, cancellation is required for the spillover propagation paths from each transmitter. This cancellation is performed in the associated cancellation path 500j as described below.

Spillover cancellation or attenuation has two advantages, namely, receiver gain can be increased so that detected targets are better matched to the dynamic range of the ADCs reducing quantization noise, and, spillover side lobes (shown in FIG. 2) can be reduced as they are produced by the spillover.

However, there is a delay in a channel between the transmitter and the receiver, and, the transmitter is also bandlimited like the receiver. This delay is characterized by an impulse response characteristic $h(n)$ as indicated in FIG. 4 (also described as a primary impulse response characteristic). In effect, there is an impulse response characteristic for each transmitter when associated with a single receiver. For example, if there are four transmitters, each receiver 450j effectively has four impulse response characteristics.

In order to attenuate the spillover, the spillover channel or impulse response characteristic $h(n)$ needs to be estimated so that a cancelling or attenuating signal can be injected into the receiver to cancel or attenuate the spillover. This is done by convolving the transmitted code sequence 415i with the estimation of the impulse response characteristic $h(n)$ for each transmitter to provide the cancellation filter, $\hat{h}(n)$ for all transmitter-receiver pairs. The evaluation of the coefficients of $\hat{h}(n)$, that is, of the cancellation filter, is performed iteratively with an adaptive processing module 510 in the cancellation path 500, the adaptive processing module 510 having as input the range profile 490 from the range and Doppler processing module 485.

A cancellation or attenuation filter 520i is convolved with the code sequence 415i for each transmitter 410i and the output thereof is applied to the digital-to-analog converters (DAC) 530a, 530b after being summed together. In effect, the cancellation filter 520i can be considered to comprise a filter element for each transmitter 410i with each filter element having a respective transmit signal 415i from an associated transmitter 410i as input.

The DACs 530a, 530b generate unfiltered cancellation signals for the I and Q branches respectively. The outputs from the DACs 530a, 530b, that is, the unfiltered cancellation signals, are filtered by respective low-pass filters 540a, 540b to provide cancellation signals 550a, 550b. The low-pass filters 540a, 540b are chosen to take into account the bandwidth limitations of the DACs 530a and 530b. The filtered cancellation signals 550a, 550b are summed with the output signals from the mixer 470 in adders 560a, 560b. The outputs from adders 560a, 560b then form the inputs to the baseband module 475 having cancelled or attenuated the spillover.

In one embodiment, the adaptive processing module 510 is configured to utilize a least squares (LMS) algorithm. However, in other embodiments, other adaptive algorithms may be utilized by the adaptive processing module 510.

By using the range profile 490 after Doppler processing, for each receiver 450j, as an input to the cancellation path 500j, it is possible to benefit from the Doppler processing gain so that the estimated spillover signal therefore contains less noise. Only the range profile at 0 speed is needed as the spillover is static, and, up to first 10 range bins of this range profile is sufficient to estimate the spillover signal. The number of range bins needed will depend on the number of significant taps in the estimated impulse response characteristic $\hat{h}(n)$ for the cancellation filter 520i, and, may be as few as 5 or less range bins or in some cases even more than 10.

The cancellation or attenuation is performed before the receiver baseband channel 475. However, the effects of the DACs 530a, 530b and the low-pass filters 540a, 540b also need to be taken into account in the cancellation. For example, the outputs from the DACs 530a, 530b are bandlimited, and the low-pass filters 540a, 540b will produce a delay thereby attenuating fast transitions in the signal. These blocks in combination with the baseband channel 475 and the ADCs 480a, 480b is called the secondary path, and, is characterized by a secondary impulse response characteristic, $q(m)$, which depends on the elements in the secondary path specific to the receiver 450j and its associated cancellation path 500j.

As the construction of the cancellation signal is performed in the digital domain but cancellation is performed in the analog domain, for good performance, the DACs 530a, 530b need to be 12-bit DAC with a sampling rate equal to the code sequence rate, which is, for example, for some automotive radar applications, at $2\times10^9$ samples per second. This is a complex structure which consumes a lot of power. However, this issue may be addressed by injecting optional noise signals (dithering signals) in the digital domain just before the DACs 530a, 530b as described below with reference to FIG. 5. With the assistance of these optional noise or dithering signals, one for each of the I and Q branches, 8-bit DACs can be used without any additional degradations.

The optional noise or dithering signals (not shown) may also be applied to the circuit illustrated in FIG. 4 where dithering is added to the output from the filter 520i before passing to the DACs 530a, 530b to generate the cancellation signals 550a, 550b.

Figure 5:
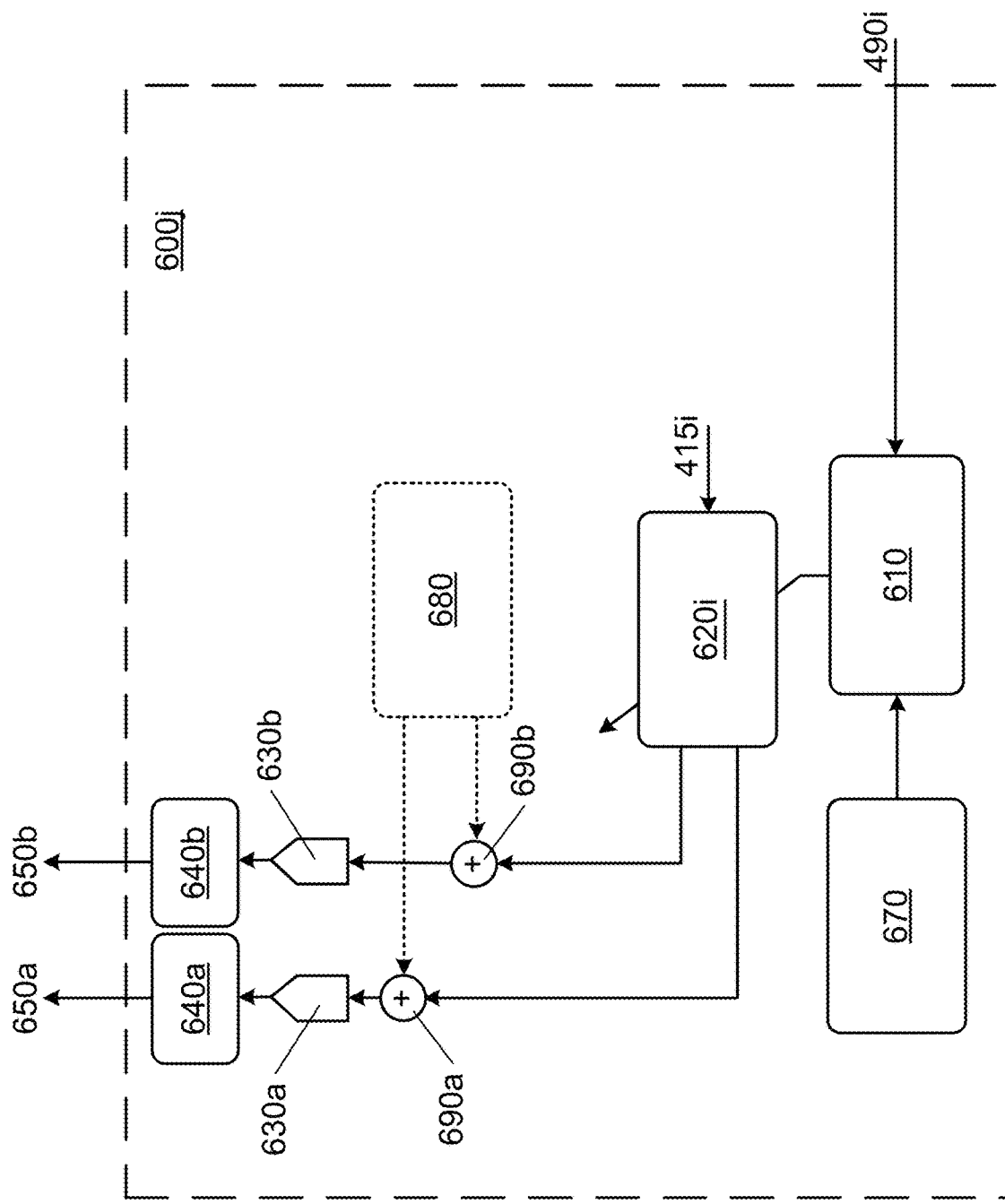
FIG. 5 illustrates a block diagram of a cancellation path with dithering.

FIG. 5 illustrates a block diagram of a cancellation path 600 in which optional dithering (injection of a noise signal) is applied. The cancellation path 600 is similar to the cancellation path 500 and the coefficients $\hat{h}(n)$ of the filter 620i are performed iteratively with adaptive processing module 610 in the cancellation path 600, the adaptive processing module 610 having as input the range profile 490 from the range and Doppler processing module 485 at 0 Doppler as shown in FIG. 4. A cancellation or attenuation filter 620 is therefore derived which is applied to the DACs 630a, 630b. The outputs from the DACs 630a, 630b are filtered by respective low-pass filters 640a, 640b to provide cancellation or attenuation signals 650a, 650b which are summed with the output signals from the mixer 470 in adders (not shown) after the mixer and before the baseband module (also not shown). In addition, the cancellation path includes a module 660 providing the estimation of q(m) to the adaptive processing module 610. An optional dithering module 680 which provides the noise or dithering signal to be added to the output from the cancellation or attenuation filter 620 in adders 690a, 690b prior to the DACs 630a, 630b and the low-pass filters 640a, 640b.

In the specific case of CW radar application, an update $\tilde{h}_{k+1}(n)$ of $\tilde{h}(n)$ becomes:

$$\tilde{h}_{k+1}(n) = \tilde{h}_k(n) - \mu \Sigma_m r_i(n-m) \hat{q}(m)$$

where $\hat{q}(m)$ is an estimation of q(m), $r_i$ is the range profile for 0 Doppler (speed is 0) corresponding to transmitter i, k is the iteration of the LMS algorithm, n is tap index of the filter 520i, m is the tap index of the filter 670, and μ is an updating factor (a positive real number) derived from the LMS adaptive processing module 510.

The estimation is performed in two steps. In the first step, an estimation of the secondary impulse response characteristic due to the secondary path, q(m), is performed. Then, the spillover attenuation is performed with the iterative estimation of h(n), called $\tilde{h}(n)$. This is a mixed-signal method as the estimation of the cancellation parameters and the construction of the cancellation signal is done in digital domain but the cancellation itself is performed in analog domain.

Isolation of q(m) is performed by shutting down the transmitter and sending a code sequence through the DACs 530a, 530b on I and Q branches. In that case, the output from the range and Doppler processing module 485 is the estimation $\hat{q}(m)$ of q(m), and can readily be estimated. As the same signal is sent continuously, this corresponds to a static target, and, q(m) is stored in the 0 Doppler range profile. Since a single code sequence is used for the estimation $\hat{q}(m)$ of q(m), in the case of a MIMO radar system, the MIMO processing in module 485 is not used. The real and imaginary parts give the behaviour for the filters in the I and Q branches respectively. As this function depends only on the radar system and not the environment, it can be performed during a calibration process. Once q(m) is estimated, spillover cancellation can be performed.

Figure 6A:
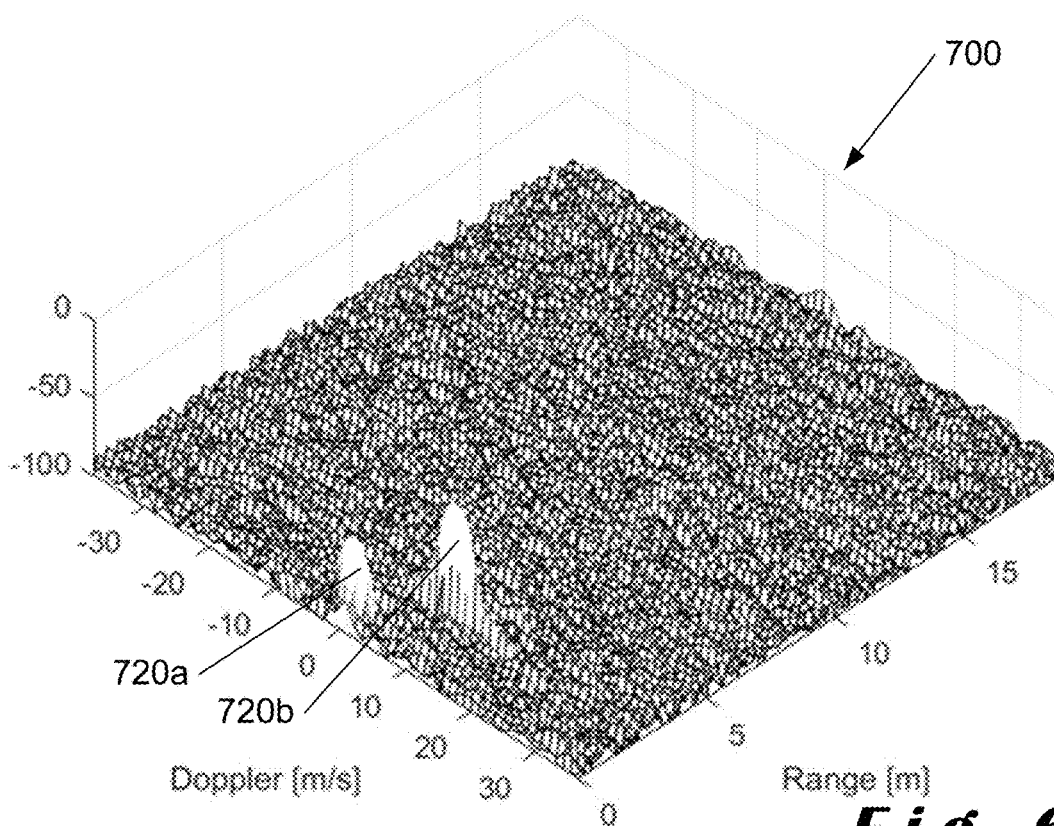
FIGS. 6a and 6b are similar to FIGS. 3a and 3b respectively but with spillover cancellation.
Figure 6B:
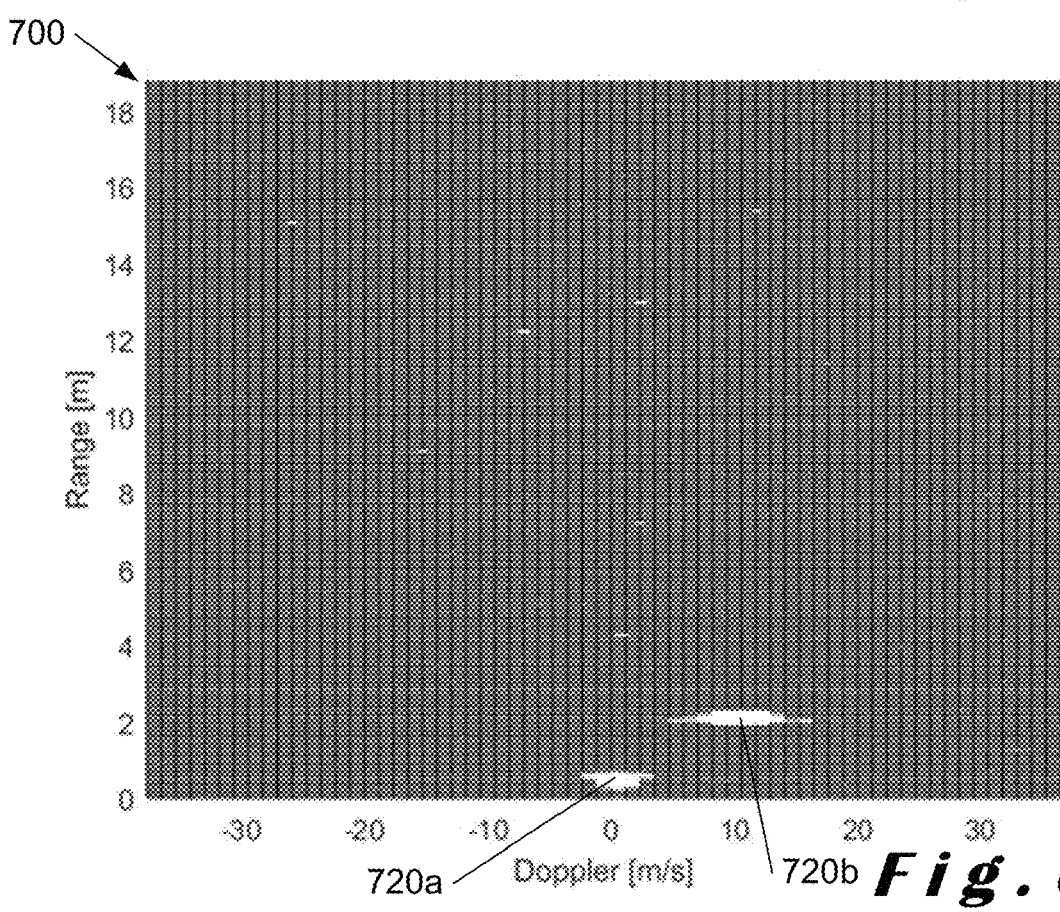

The performance is shown in a range-Doppler map 700 of FIGS. 6a and 6b. Here, a moving target is detected in position 720b where spillover after attenuation is indicated at 720a. In the range-Doppler map 700, there are no ridges as shown in FIGS. 3a and 3b. In this radar system generating the range-Doppler map 700, 9-bit ADCs were used prior to the range and Doppler processing module.

Figure 7A:
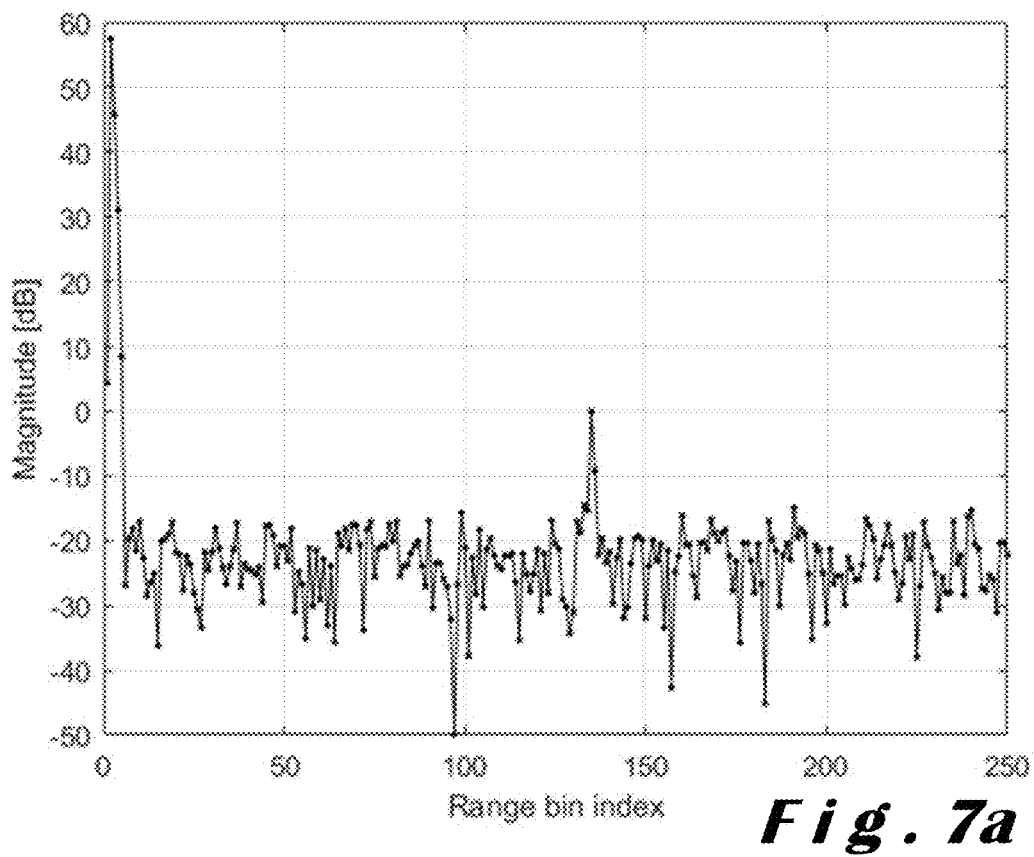
FIG. 7a illustrates a range profile for a MIMO radar system for a static target without spillover cancellation.
Figure 7B:
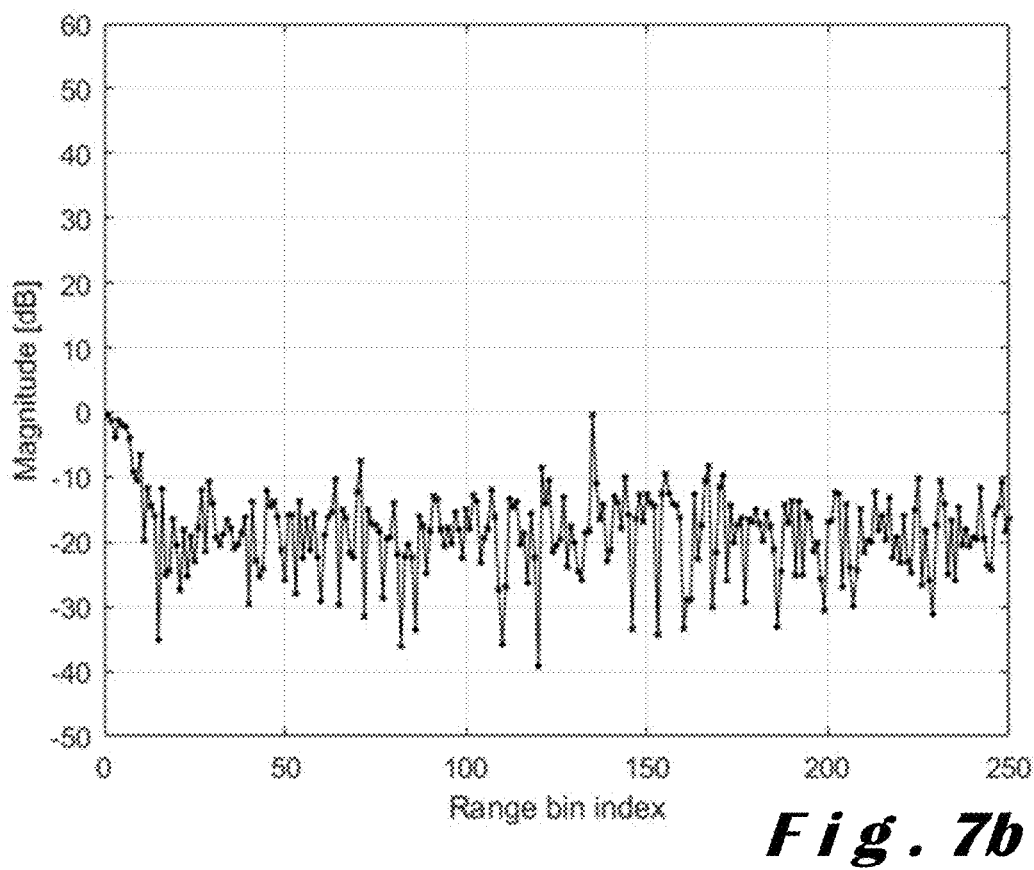
FIG. 7b illustrates a range profile for a MIMO radar system for a static target with spillover cancellation using an 8-bit digital-to-analogue converter (DAC)
Figure 7C:
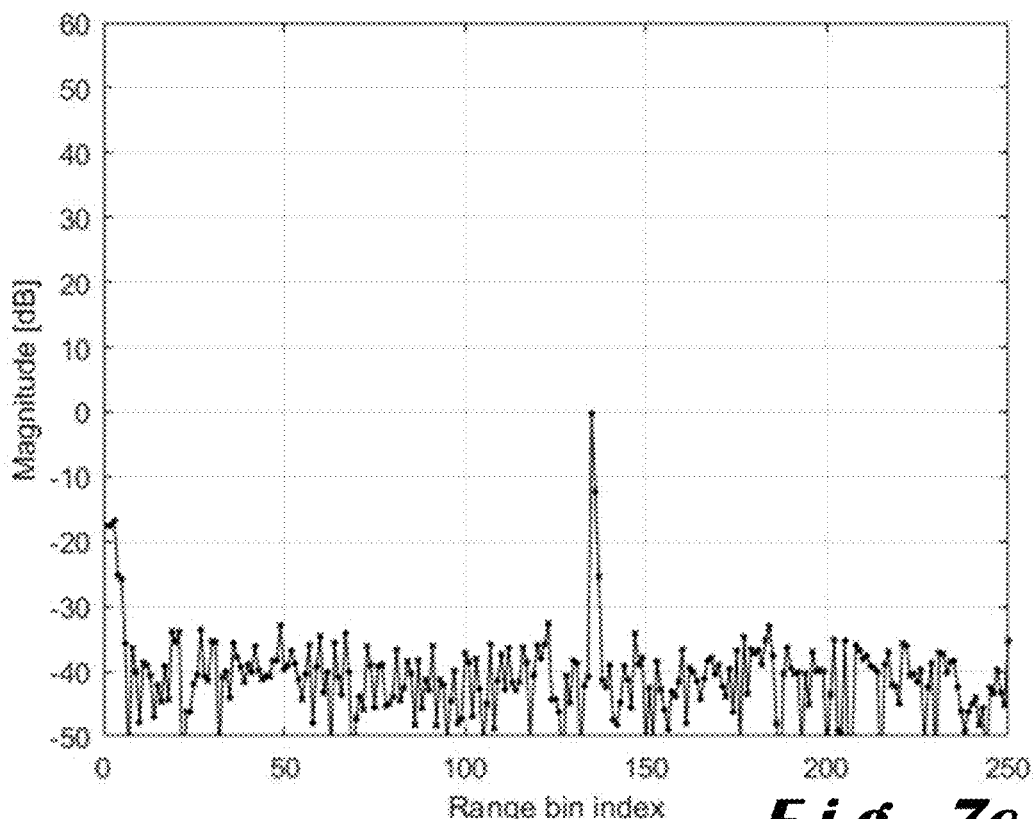
FIG. 7c illustrates a range profile for a MIMO radar system for a static target with spillover cancellation using an 8-bit DAC and with dithering.

FIGS. 7a to 7c illustrate the performance for a fixed (stationary) target without spillover cancellation (FIG. 7a), with spillover cancellation using 8-bit DACs without dithering (FIG. 7b) and with spillover cancellation using 8-bit DACs with dithering (FIG. 7c). In FIG. 7a, a large peak at range bin 0 indicates spillover; in FIG. 7b, there is no spillover but sensitivity is not improved as there is no range side lobe attenuation due to the limited resolution of the DAC; and in FIG. 7c, sensitivity is also improved with dithering as there is no degradation coming from the DACs. From this performance, 8-bit DACs are sufficient to achieve low range side lobes.

Figure 8A:
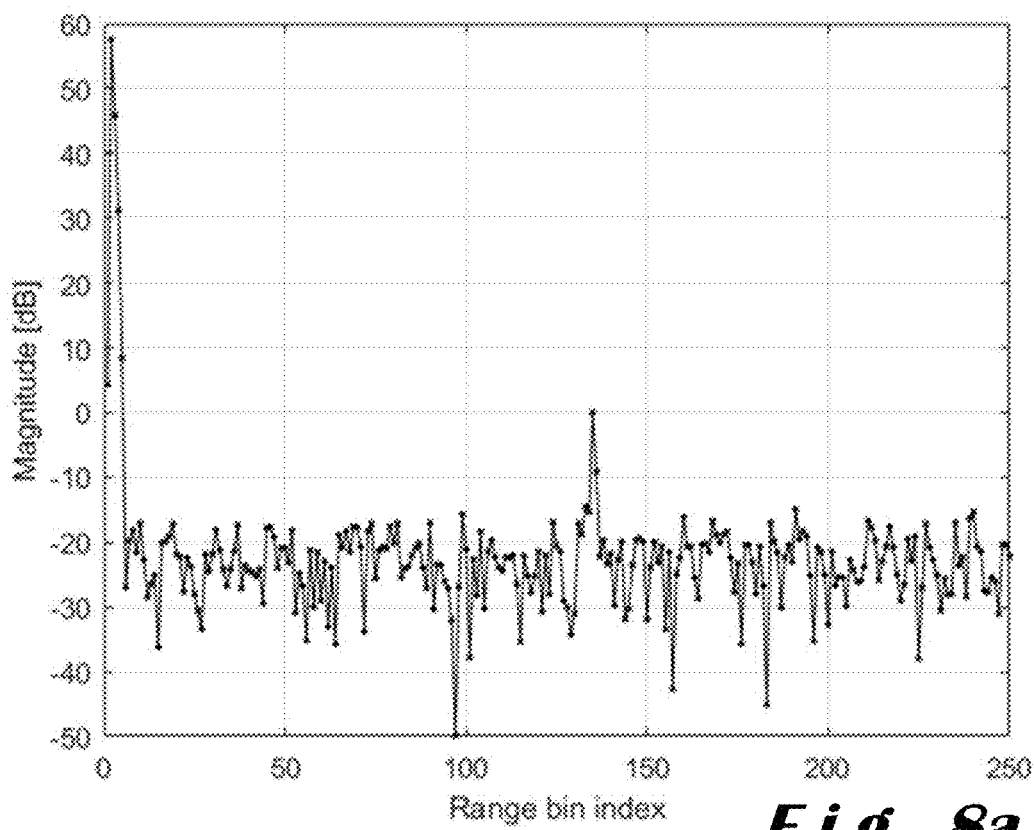
Figure 8B:
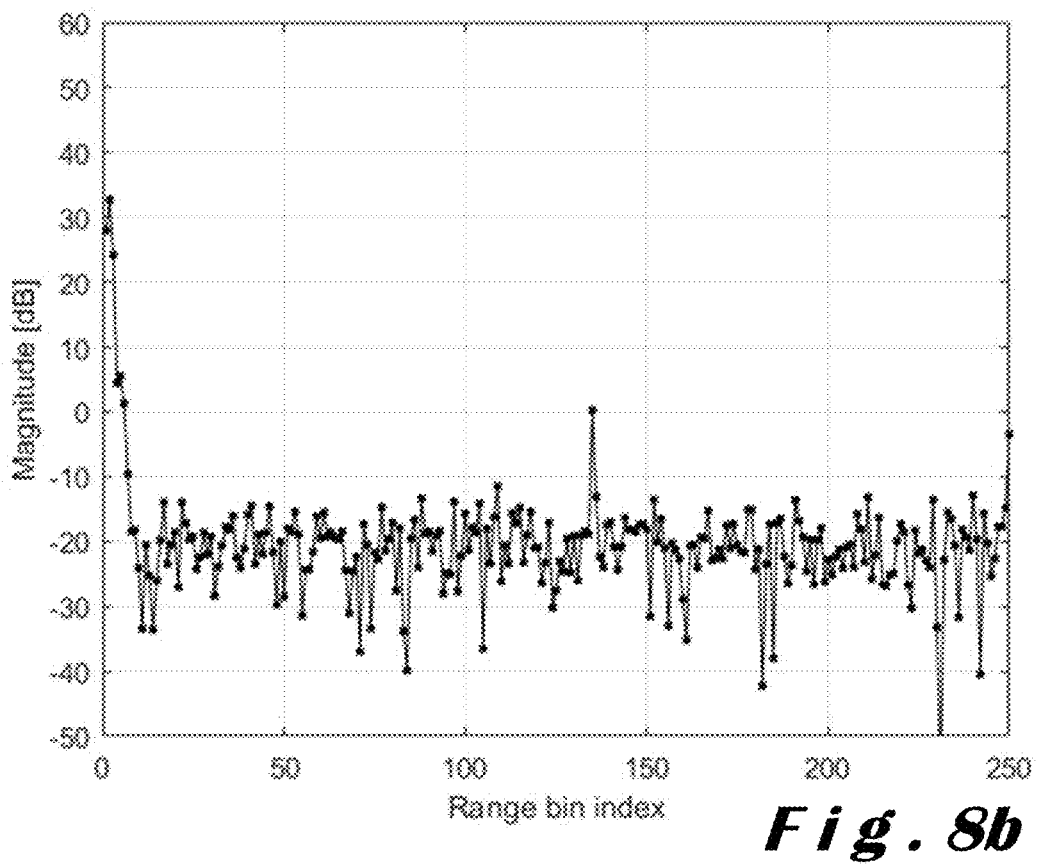
FIG. 8b illustrates a range profile for a MIMO radar system for a static target with spillover cancellation using an ideal DAC with no adaptive baseband gain.
Figure 8C:
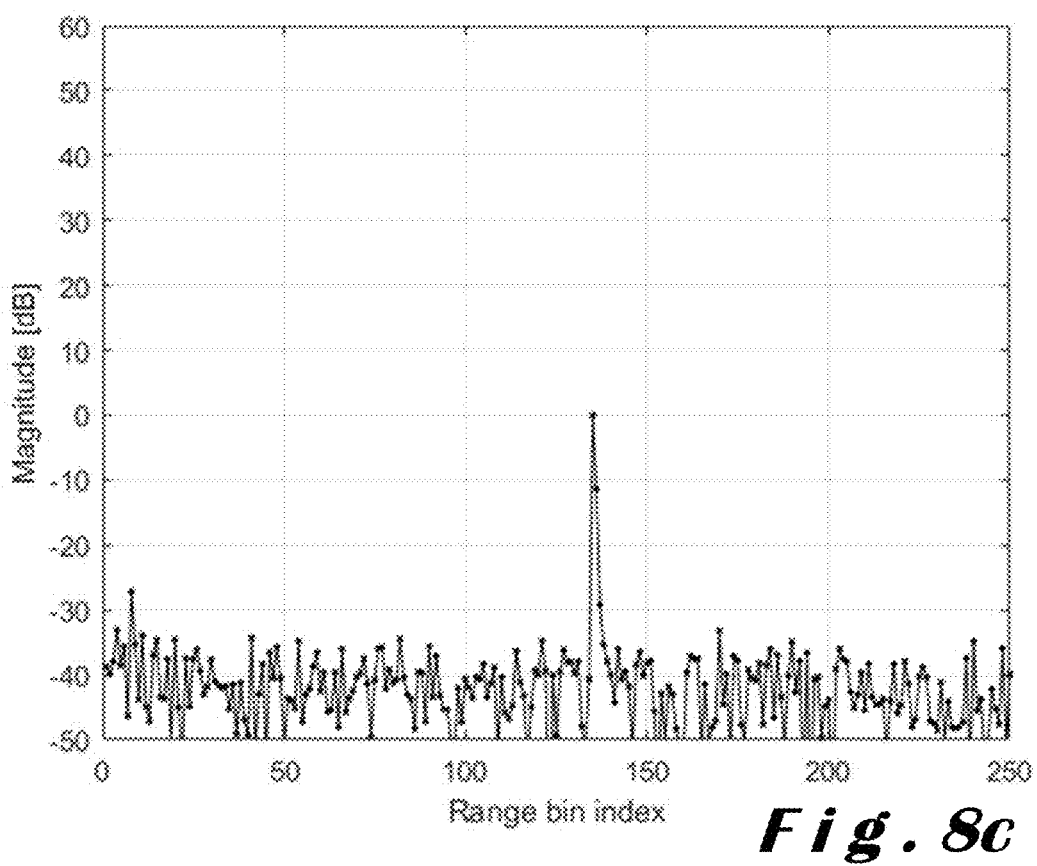
FIG. 8c illustrates a range profile for a MIMO radar system for a static target with spillover cancellation using an ideal DAC and with adaptive baseband gain.

FIGS. 8a to 8c illustrate the performance for a 7-bit ADC for a fixed (stationary) target without spillover cancellation (FIG. 8a), with spillover cancellation with an ideal DAC with a fixed baseband gain (FIG. 8b), and, with spillover cancellation with an ideal DAC with adaptive baseband gain (FIG. 8c). An "ideal" DAC is one which has infinite resolution which is not achievable in practice.

In FIG. 8a, a large peak at range bin 0 indicates spillover as before; in FIG. 8b, the peak at range bin 0 is attenuated but is still present; and in FIG. 8c, the spillover is attenuated and the target is now the largest peak. More bits are required to achieve low range side lobes only if the receiver has a fixed gain which cannot be increased while the spillover is attenuated. In effect, as the spillover has been attenuated, it is possible to adaptively increase the gain in baseband so that the target will fill more bits in the ADC and the thermal noise will become similar to the quantization noise. With this functionality, a 7-bit ADC provides the same performance as a 9-bit ADC if the range profile shown in FIG. 7c is compared with the range profile shown in FIG. 8c.

The cancellation filter update can only be performed after the range and Doppler processing, and, the parameters of the cancellation filter must be constant during acquisition of the samples required for each range-Doppler map.

It will readily be appreciated that, for a MIMO radar system, each transmitter-receiver pair has its own h(n), and this needs to be estimated for each transmitter-receiver pair. Once the estimation of h(n) is obtained for each transmitter-receiver pair, a different cancellation signal can be provided in each receiving path. The only difference between a MIMO radar system and a SISO radar system is that the code sequence used for the orthogonalization of each transmitter needs to be taken into account. As the code sequence may be defined by a Hadamard matrix (composed of values of +1 and −1) and which ensures orthogonality, the use of the code sequence does not introduce much complexity when compared to the SISO system.

The simulations performed to evaluate the impact of spillover cancellation as described above with reference to FIGS. 7a to 7c and 8a to 8c utilized a PMCW radar with an "almost perfect sequence" (APS), namely, a binary sequence composed of values of +1 and −1. Such a sequence produces a range profile with zero range side lobes except in one range bin as described in "PMCW waveform and MIMO technique for a 79 GHz CMOS automotive radar" discussed above. However, other sequences, such as, maximum length sequences or m-sequences, constant amplitude zero auto-correlation (CAZAC) codes may be used. The only requirement is that the periodic auto-correlation of these codes or sequences produce zero range side lobes (for example, APS and CAZAC) or very low side lobes (m-sequence).

Figure 9:
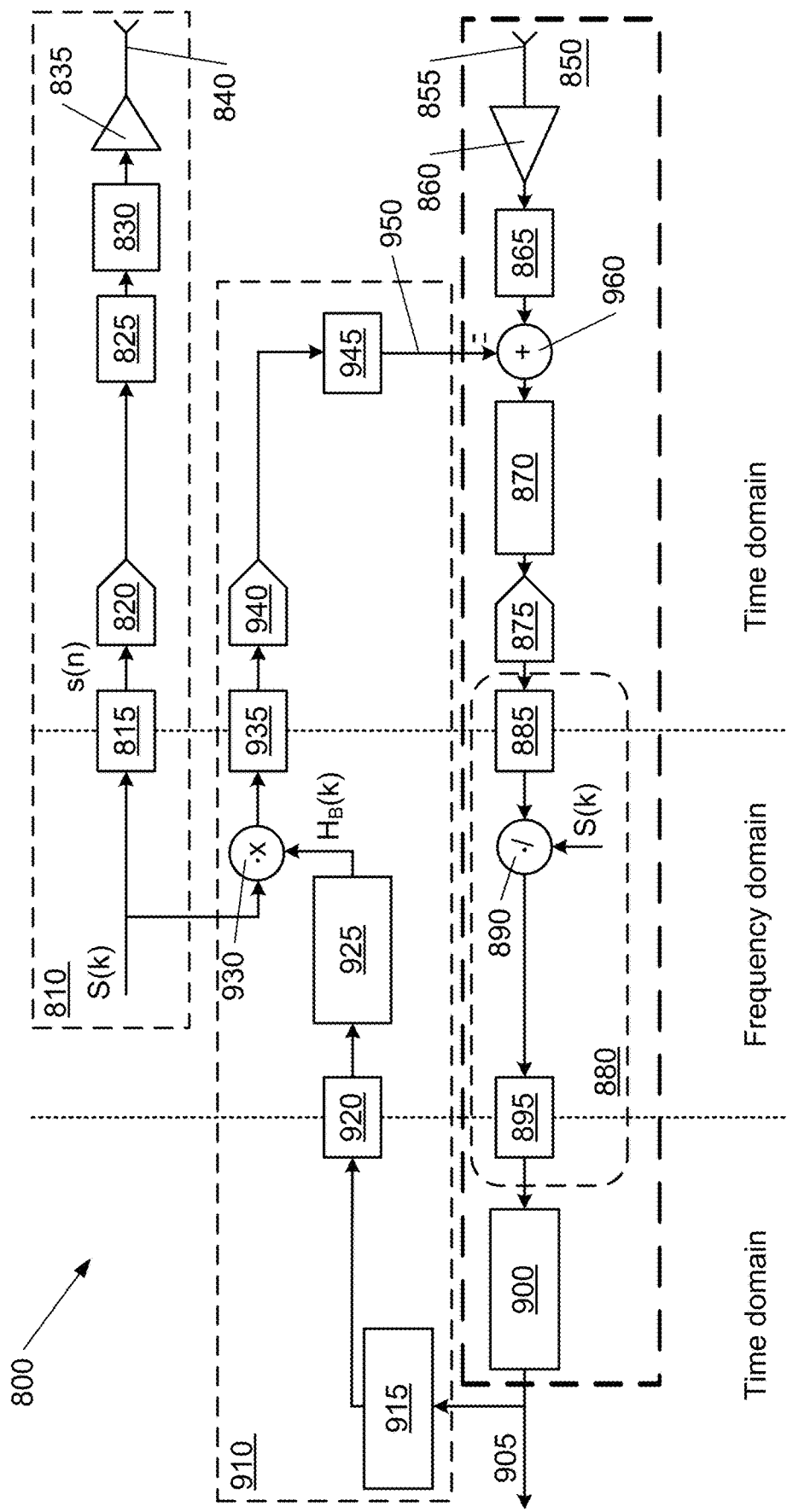
FIG. 9 illustrates frequency-division spillover cancellation for a SISO OFDM radar system.

The method of the disclosed technology can be adapted for use with OFDM radar systems as shown in FIG. 9. FIG. 9 illustrates an OFDM radar system 800 comprising a transmitter 810i and a receiver 850j. As before, the suffices "i" and "j" refer to the index of the transmitters and receivers respectively in the OFDM radar system 800. In one embodiment, i=j=4 as described above. However, the number of transmitters and the number of receivers do not need to be same.

The transmitter 810i includes an IDFT 815 which converts a spectrum S(k) to a signal s(n) for transmission in the time-domain, a DAC 820, a mixer 825, a transmitter filter 830, a power amplifier 835, and a transmitting antenna 840.

As shown, the majority of the transmitter 810i is in the time domain with the exception of the spectrum generator with the IDFT 815 providing a bridge between the frequency domain and the time domain.

The receiver 850j includes a receiving antenna 855 for receiving the returned signal, a low noise amplifier 860, a mixer 865, a baseband module 870 and an ADC 875. The receiver 850j is in the time domain.

A range processing module 880 operates in the frequency domain to provide range information and comprises a DFT 885 which receives the digital signal from the ADC 875 in the receiver path and converts it into a frequency signal which is divided with the spectrum S(k) in divider 890. The output from the divider 890 is passed to an IDFT 895 where the frequency signal is converted to a range profile, and, N consecutive range profiles can be used for Doppler processing module 900 in the time domain.

If the amplitude of the spectrum S(k) is constant, then the divider 890 may, alternatively, comprise a multiplier, and, the frequency signal is multiplied with a complex conjugate of S(k).

The Doppler processing module 900 provides an output range profile or output data 905 in a similar way to the range and Doppler processing modules 190 (FIG. 1) and 485 (FIG. 4) described above.

A cancellation path 910j is provided for attenuation or cancellation of the spillover which utilizes the output range profile or output data 905 and the spectrum S(k) to determine the spillover cancellation. As shown, the cancellation path 910j has components in both the time domain and the frequency domain.

The cancellation path 910j comprises a selection module 915 which selects the first range bins from the output range profile or output data 905, a DFT 920 which converts the signal to the frequency domain, an adaptive filter 925 which generates an output HB(k) to be mixed with the spectrum S(k) in mixer 930. The output from the mixer 930 is passed to an IDFT 935 which converts the frequency domain signal into a time domain signal. The digital signal is converted to an analog signal in the DAC 940 before it is filtered by low pass filter 945 to provide a cancellation signal 950. The cancellation signal 950 is added to the signal in the receiver 850j in adder 960 before the baseband module 870.

Alternatively, the cancellation path 500j, shown in FIG. 4, may be modified for use with OFDM radar systems where the code sequence 415i is replaced with the spectrum signal with a DFT being provided before the adaptive processing module 510 and an IDFT being provided after the cancellation filter 520 prior to the DACs 530a, 530b.

Similarly, the cancellation path 600j, shown in FIG. 5, may be modified in the same way with the code sequence 415i being replaced with the spectrum signal, a DFT being provided before the adaptive processing module 610 and an IDFT being provided after the cancellation filter 620 prior to the adders 690a, 690b where dithering from dithering module 680 is added.

Isolation of q(m) is performed in the same way as described above with reference to FIG. 4.

Figure 10:
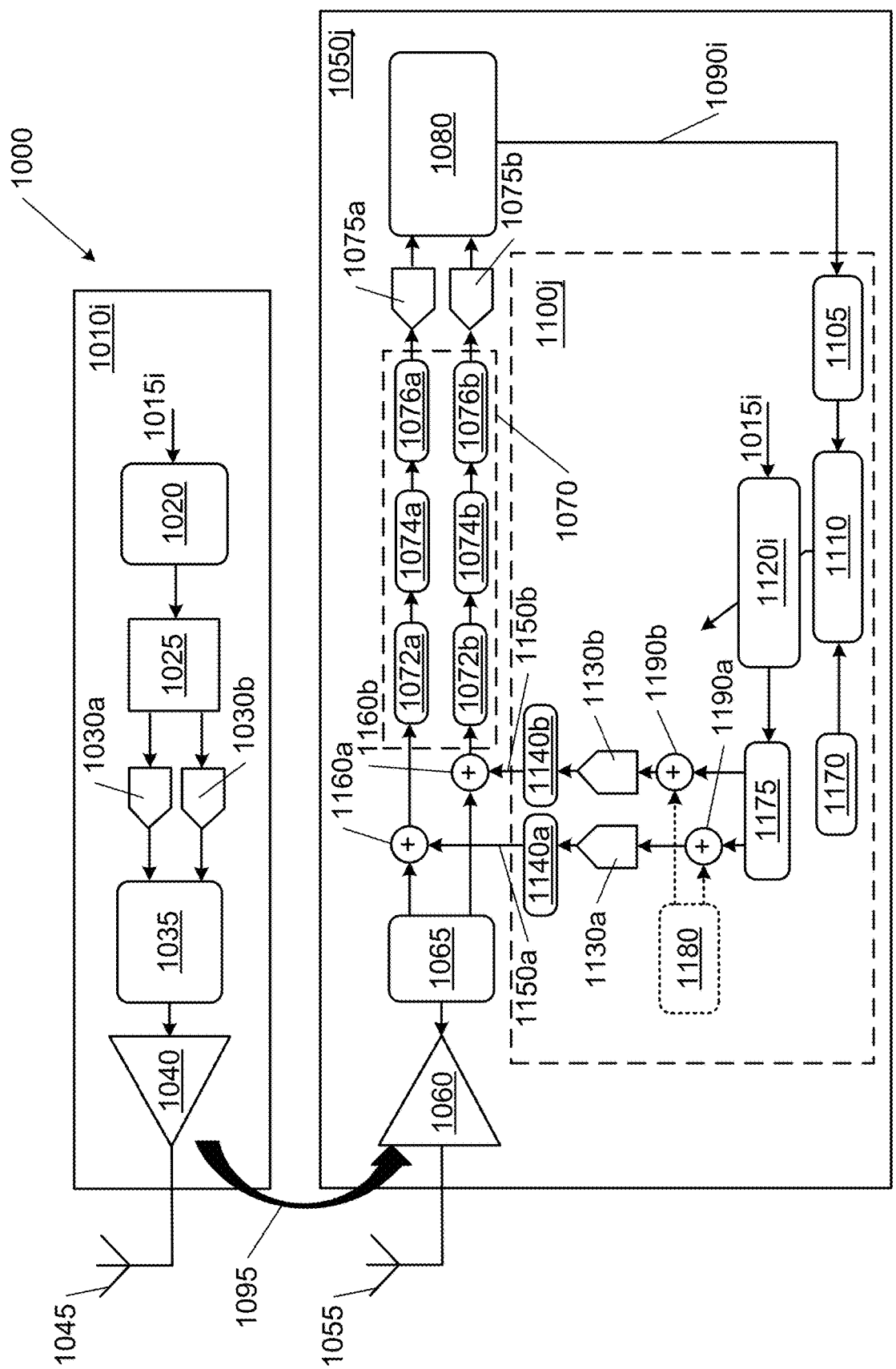
FIG. 10 is similar to FIG. 4 but for an SISO or MIMO OFDM radar system.

FIG. 10 illustrates spillover cancellation in a frequency domain OFDM radar system 1000 which comprises one or more transmitters 1010i and one or more receivers 1050j with a cancellation path 1100j associated with each of the one or more receivers 1050j. Each transmitter 1010i comprises a spectrum 1015i which is converted to time domain signals by an IDFT module 1020 which, in turn, are converted to analog signals by DACs 1030a, 1030b. The outputs from the DACs 1030a, 1030b are passed to a transmit filter 1035 and to a power amplifier 1040 prior to being transmitted by the antenna 1045.

The receiver 1050j comprises a receive antenna 1055 which provides received signals to a low noise amplifier 1060. The amplified signal is passed to a mixer 1065 where the signals are split into I and Q branches and sent to a baseband module 1070. The baseband module 1070 comprises, for each branch, a low pass filter 1072a, 1072b, a variable gain amplifier 1074a, 1074b and a non-linearity unit 1076a, 1076b corresponding to any non-linearity in the baseband module 1070 (where the suffix "a" refers to the I branch and the suffix "b" refers to the Q branch). The output from the baseband module 1070 is passed to ADCs 1075a, 1075b and then to the range and Doppler processing module 1080. Output 1090i from the range and Doppler processing module 1080 corresponds to a range profile at 0 Doppler per transmitter.

Spillover from one of the transmitters 1010i to a receiver 1050j is indicated at 1095.

A cancellation path 1100j is provided for each receiver 1050j in which a DFT module 1105 converts the range profile into the frequency domain for the update module 1110 which updates the cancellation filter 1120 in the frequency domain. As before, in each cancellation filter 1120i, the transmitted spectrum 1015i is multiplied with the frequency domain estimation of the spillover propagation path to provide the cancellation signals. The cancellation signals corresponding to each transmitter 1010i are summed (not shown), and the summed output from the cancellation filter 1120i is passed to an IDFT module 1175 where the cancellation signals are converted back into the time domain prior to being passed to DACs 1130a, 1130b and low pass filters 1140a, 1140b to form respective cancellation signals 1150a, 1150b for the input signals to the baseband module 1070 as before. Adders 1160a, 1160b add the cancellation signals 1150a, 1150b to the input signal to effect cancellation of the primary response characteristic corresponding to spillover in a similar way to that described with reference to FIG. 4.

By estimating a secondary response characteristic corresponding to the DACs 1130a, 1130b, low pass filters 1140a, 1140b, baseband module 1070 and the ADCs 1075a, 1075b, and, using this characteristic as a second input to the adaptive processing module 1110, the cancellation signals 1150a, 1150b can take into account the effect of the secondary impulse response characteristic 1170, q(m), as described above.

As described above, an optional dithering module 1180 may be implemented to add dithering signals to the output signals from the IDFT 1175 in adders 1190a, 1190b.

It will readily be understood that the cancellation or attenuation is performed on the receiver baseband channel and takes into account the effect of the DACs, the low pass filters etc. as described above with reference to FIG. 5.

Figure 11:
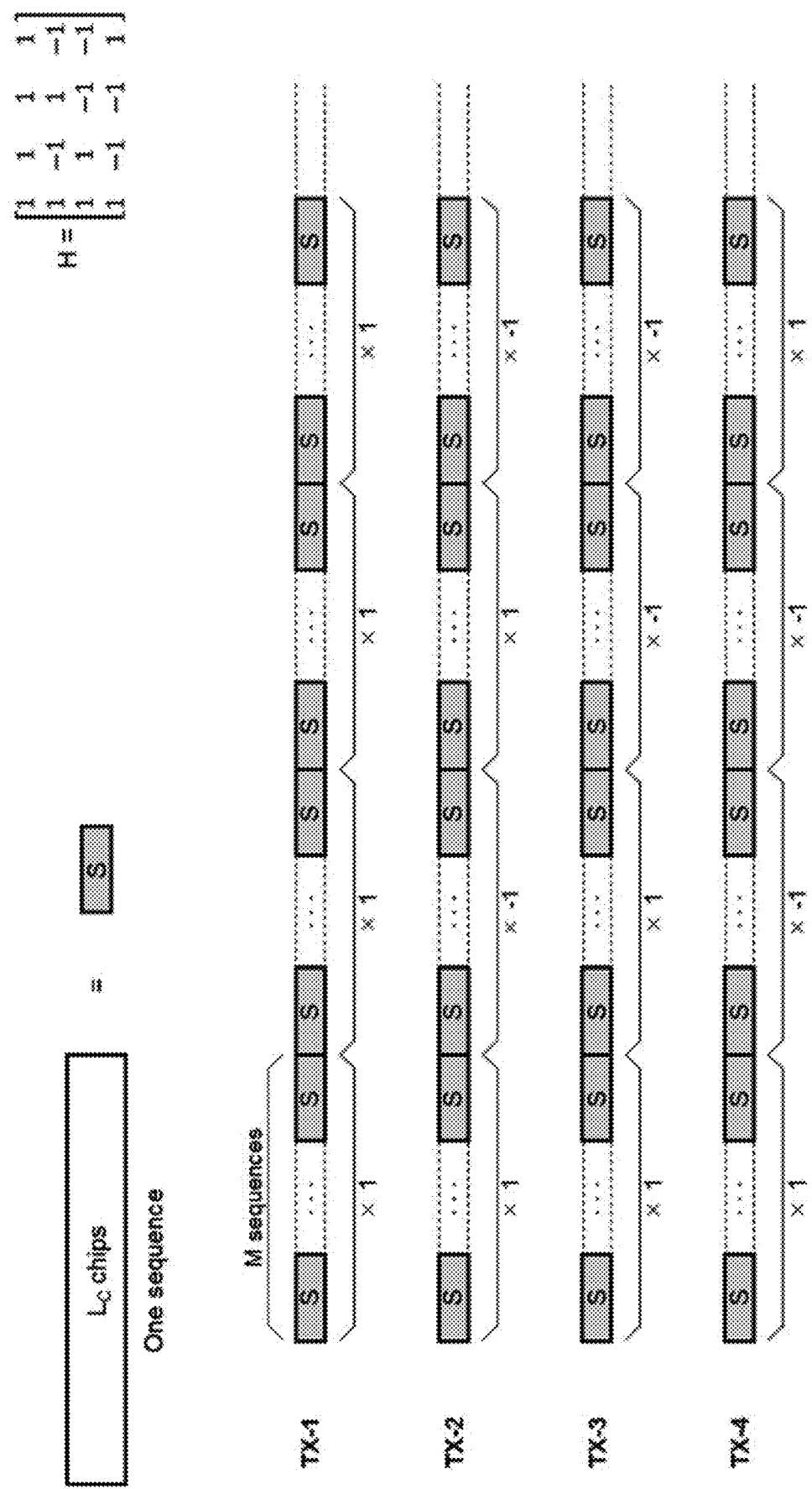
FIG. 11 illustrates coded MIMO based on an 4×4 Hadamard matrix H for a four transmitter radar system.

FIG. 11 illustrates code sequences for a four-transmitter MIMO radar system which utilizes the Hadamard matrix as shown, and, where each transmitter uses one line of the matrix for its code sequence.

The cancellation paths or circuits of the disclosed technology can be connected to or incorporated on a radar chip to improve its performance.

Although the disclosed technology has been described with reference to specific radar system implementations, it will be appreciated that the disclosed technology is not limited to these implementations and can be used to provide spillover attenuation or cancellation for other implementations.

What is claimed is:

1. A method of attenuating an effect of spillover in a radar system having at least one transmitter and at least one receiver, the method comprising:
   determining, for each transmitter-receiver pair, a primary impulse response characteristic corresponding to a spillover channel between the transmitter and the receiver of the transmitter-receiver pair;
   deriving, for each receiver, a cancellation filter based on the primary impulse response characteristic;
   for each receiver, applying cancellation signals from the cancellation filter into I and Q branches before a baseband module and an ADC and after a mixer to attenuate the effect of spillover from each transmitter in output data from the receiver;
   for each receiver, deriving a cancellation path which includes the cancellation filter; and
   receiving a reference of a signal to be transmitted by each transmitter of the radar system and the output data from the receiver of the transmitter-receiver pair in the cancellation path,
   wherein deriving, for each receiver, a cancellation filter based on the primary impulse response characteristic comprises, in the cancellation path for each receiver, using the primary impulse response characteristic for each transmitter in the radar system with that particular receiver, the reference of the signal to be transmitted by each transmitter, and the output data from the receiver separate from the reference of the signal to be transmitted, for generating the cancellation signals.

2. The method of claim 1, further comprising, in the cancellation path of each receiver, adaptively processing the output data from the receiver to update coefficients of the cancellation filter.

3. The method of claim 1, further comprising, in the cancellation path of each receiver, inputting the reference of the signal to be transmitted by each transmitter to the cancellation filter.

4. The method of claim 1, further comprising:
   determining, for each receiver, a secondary impulse response characteristic corresponding to components in the receiver and the cancellation path associated with that receiver; and modifying each cancellation filter m accordance with the secondary impulse response characteristic.

5. The method of claim 4, further comprising, in the cancellation path of each receiver, using the secondary impulse response characteristic with the output data from the receiver for updating coefficients of the cancellation filter.

6. The method of claim 4, further comprising, for each cancellation path, applying a dithering signal to the output of the cancellation filter to produce a modified cancellation signal.

7. The method of claim 1, further comprising, for each receiver, implementing the cancellation path in the time domain.

8. The method of claim 1, further comprising, for each receiver, implementing the cancellation path partially in the time domain and partially in the frequency domain.

9. The method of claim 1, wherein the filtered cancellation signal is summed with an output signal from the mixer in an adder, and wherein an output from the adder forms an input to the baseband module having cancelled or attenuated the spillover.

10. A system for cancelling an effect of spillover in a radar system having at least one transmitter and at least one receiver, the system having circuitry comprising:
    for each transmitter-receiver pair, primary impulse response circuitry configured to generate a primary impulse response characteristic indicative of a spillover channel between the transmitter and the receiver of the transmitter-receiver pair;
    for each receiver, a cancellation filter associated therewith and configured for generating cancellation signals for the receiver; and
    for each receiver, combining elements for applying cancellation signals from the cancellation filter to the receiver into I and O branches before a baseband module and an ADC and after a mixer to attenuate the effect of spillover in output data from the receiver;
    wherein each receiver comprises a cancellation path which includes the cancellation filter for the receiver, the cancellation path being further configured to:
    receive the primary impulse response characteristic from the primary impulse response circuitry, a reference of a signal to be transmitted by each transmitter of the radar system, and the output data from the receiver, and
    provide each reference of signal and the output data from the receiver together with the primary impulse response characteristic as separate inputs to the cancellation filter for the generation of the cancellation signals therefrom.

11. The system of claim 10, wherein, for each receiver, the cancellation path further comprises adaptive processing circuitry configured to receive he output data from the receiver to update coefficients for the cancellation filter.

12. The system of claim 10, wherein, for each receiver, the cancellation path further comprises secondary impulse response circuitry configured to generate a secondary impulse response characteristic corresponding to components in the receiver and the cancellation path associated with that receiver, and the cancellation path is further configured to update coefficients of the cancellation filter in accordance with the secondary impulse response characteristic.

13. The system of claim 12, wherein, for each cancellation path of each receiver, the adaptive processing circuitry is further configured to receive the secondary impulse response characteristic and to use the secondary impulse response characteristic with the output data from the receiver to update coefficients for the cancellation filter.

14. The system of claim 12, wherein, for each receiver, the cancellation path further comprises dithering circuitry configured to generate a dithering signal, and combining circuitry configured to combine the dithering signal with the cancellation signal to produce a modified cancellation signal.

15. A radar system configured to be connected to the cancellation system according to claim 10.

16. The system of claim 10, wherein the filtered cancellation signal is summed with an output signal from the mixer in an adder, and wherein an output from the adder forms an input to the baseband module having cancelled or attenuated the spillover.

17. A radar system, comprising:
    a cancellation circuit configured to cancel an effect of spillover in a radar system having at least one transmitter and at least one receiver, the cancellation circuit comprising:
    for each transmitter-receiver pair, primary impulse response circuitry configured to generate a primary impulse response characteristic indicative of a spillover channel between the transmitter and the receiver of the transmitter-receiverpair;

for each receiver, a cancellation filter associated therewith and configured to generate cancellation signals for the receiver; and for each receiver, combining elements for applying cancellation signals from the cancellation filter to the receiver into I and Q branches before a baseband module and an ADC and after a mixer so as to attenuate the effect of spillover in output data from the receiver;

wherein each receiver comprises a cancellation path which includes the cancellation filter for the receiver, the cancellation path being further configured to:

receive the primary impulse response characteristic from the primary impulse response circuitry, a reference of a signal to be transmitted by each transmitter of the radar system, and the output data from the receiver, and provide each reference of the signal and the output data from the receiver together with the primary impulse response characteristic as separate inputs to the cancellation filter for the generation of the cancellation signals therefrom.

18. The radar system of claim 17, wherein, for each receiver, the cancellation path further comprises adaptive processing circuitry configured to receive the output data from the receiver to update coefficients for the cancellation filter.

19. The radar system of claim 17, wherein, for each receiver, the cancellation path further comprises secondary impulse response circuitry configured to generate a secondary impulse response characteristic corresponding to components in the receiver and the cancellation path associated with that receiver, and, the cancellation path is further configured for updating coefficients of the cancellation filter in accordance with the secondary impulse response characteristic.

20. The radar system of claim 19, wherein, for each cancellation path of each receiver, the adaptive processing circuitry is further configured to receive the secondary impulse response characteristic and for using the secondary impulse response characteristic with the output data from the receiver to update coefficients for the cancellation filter.

21. The radar system of claim 19, wherein, for each receiver, the cancellation path further comprises dithering circuitry configured to generate a dithering signal, and combining circuitry configured to combine the dithering signal with the cancellation signal to produce a modified cancellation signal.

22. The radar system of claim 17, wherein the filtered cancellation signal is summed with an output signal from the mixer in an adder, and wherein an output from the adder forms an input to the baseband module having cancelled or attenuated the spillover.

* * * * *

UNITED STATES PATENT AND TRADEMARK OFFICE
CERTIFICATE OF CORRECTION

PATENT NO. : 11,428,778 B2
APPLICATION NO. : 16/450885
DATED : August 30, 2022
INVENTOR(S) : Marc Bauduin It is certified that error appears in the above-identified patent and that said Letters Patent is hereby corrected as shown below:

In the Specification

Column 5, Line 66, delete "Hadarmard" and insert -- Hadamard --.

Column 10, Line 17, after "least" insert -- mean --.

In the Claims

Column 15, Line 46, in Claim 4, delete "m" and insert -- in --.

Column 16, Line 14, in Claim 10, delete "O" and insert -- Q --.

Column 16, Line 30, in Claim 11, delete "he" and insert -- the --.

Column 17, Line 2, in Claim 17, delete "receiverpair;" and insert -- receiver pair; --.

Signed and Sealed this
Twentieth Day of December, 2022

Katherine Kelly Vidal
*Director of the United States Patent and Trademark Office*